US012376096B2

(12) United States Patent
Luo et al.

(10) Patent No.: US 12,376,096 B2
(45) Date of Patent: Jul. 29, 2025

(54) SIGNALING ENHANCEMENTS FOR SIMULTANEOUS MULTIPLEXING IN AN INTEGRATED ACCESS AND BACKHAUL NETWORK

(71) Applicant: QUALCOMM Incorporated, San Diego, CA (US)

(72) Inventors: Jianghong Luo, Skillman, NJ (US); Navid Abedini, Basking Ridge, NJ (US); Luca Blessent, Whitehouse Station, NJ (US); Tao Luo, San Diego, CA (US); Naeem Akl, Somerville, NJ (US); Junyi Li, Fairless Hills, PA (US); Karl Georg Hampel, Hoboken, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 924 days.

(21) Appl. No.: 17/445,071

(22) Filed: Aug. 13, 2021

(65) Prior Publication Data

US 2023/0050970 A1 Feb. 16, 2023

(51) Int. Cl.
*H04W 72/541* (2023.01)
*H04B 7/06* (2006.01)
(Continued)

(52) U.S. Cl.
CPC ........ *H04W 72/541* (2023.01); *H04B 7/0695* (2013.01); *H04B 7/06952* (2023.05);
(Continued)

(58) Field of Classification Search
None
See application file for complete search history.

(56) References Cited

U.S. PATENT DOCUMENTS

2020/0337057 A1* 10/2020 Abedini .............. H04B 17/336
2022/0132508 A1*  4/2022 Novlan ................ H04W 72/27
(Continued)

OTHER PUBLICATIONS

Ericsson: "Resource Multiplexing and DC in Enhanced IAB", 3GPP TSG-RAN WG1 Meeting #105-e, R1-2105852, 3rd Generation Partnership Project, Mobile Competence Centre, 650, Route Des Lucioles, F-06921 Sophia-Antipolis Cedex, France, vol. RAN WG1, No. Online, May 10, 2021-May 27, 2021 May 11, 2021, XP052006465, pp. 1-19, pp. 8,9,10.

(Continued)

*Primary Examiner* — Jay L Vogel
(74) *Attorney, Agent, or Firm* — Kevin M. Donnelly; Harrity & Harrity, LLP

(57) ABSTRACT

Various aspects of the present disclosure generally relate to wireless communication. In some aspects, a parent node in an integrated access and backhaul (IAB) network may transmit, to an IAB node having a mobile termination function (IAB-MT) and a distributed unit (IAB-DU), signaling indicating a set of restricted IAB-DU beams and associating the set of restricted IAB-DU beams with one or more IAB-MT beams, the set of restricted IAB-DU beams determined based on measurements related to interference caused by the IAB-DU and the IAB-MT performing a simultaneous operation in one or more simultaneous multiplexing modes. Additionally or alternatively, the parent node may perform scheduling for the IAB-MT based on signaling received from the IAB node that indicates beam-specific parameters related to a multiplexing capability for a beam pair that includes an IAB-MT beam and an IAB-DU beam associated with the IAB-MT beam. Numerous other aspects are provided.

26 Claims, 14 Drawing Sheets

(51) Int. Cl.
  *H04B 7/08*     (2006.01)
  *H04B 7/155*    (2006.01)
  *H04B 17/345*   (2015.01)
  *H04W 24/08*    (2009.01)
  *H04W 72/044*   (2023.01)
  *H04W 72/0446*  (2023.01)
  *H04W 72/12*    (2023.01)
  *H04W 72/21*    (2023.01)
  *H04W 72/23*    (2023.01)
  *H04W 84/04*    (2009.01)

(52) U.S. Cl.
  CPC ......... *H04B 7/088* (2013.01); *H04B 7/15542* (2013.01); *H04B 17/345* (2015.01); *H04W 24/08* (2013.01); *H04W 72/0446* (2013.01); *H04W 72/046* (2013.01); *H04W 72/12* (2013.01); *H04W 72/21* (2023.01); *H04W 72/23* (2023.01); *H04W 84/047* (2013.01)

(56) References Cited

U.S. PATENT DOCUMENTS

2022/0368478 A1*  11/2022  Choi .................... H04W 72/29
2023/0309067 A1*  9/2023   You ..................... H04W 72/044
2023/0421316 A1*  12/2023  Laddu ................. H04B 7/0408
2024/0381403 A1    11/2024  Luo et al.

OTHER PUBLICATIONS

Moderator (ATT): "Feature Lead Summary #3 of 8.10.1", 3GPP TSG-RAN WG1 #105-e, R1-2106056, 3rd Generation Partnership Project, Mobile Competence Centre, 650, Route Des Lucioles, F-06921 Sophia-Antipolis Cedex, France, vol. RAN WG1, No. e-Meeting, May 10, 2021-May 27, 2021 May 27, 2021, XP052015711, 55 Pages, p. 1, section 2, Table, p. 2, top, p. 23, bottom, p. 24, Table, p. 13, Proposal 11.

Partial International Search Report—PCT/US2022/074474—ISA/EPO—Nov. 9, 2022.

Huawei, et al., "Resource Multiplexing between Backhaul and Access for IAB Duplexing Enhancements", 3GPP TSG RAN WG1 Meeting #104bis-e, R1-2102340, Mobile Competence Centre, 650, Route Des Lucioles, F-06921 Sophia-Antipolis Cedex, France, vol. RAN WG1, No. E-meeting, Apr. 12, 2021-Apr. 20, 2021, Apr. 7, 2021, 13 Pages, XP052177060, p. 1 first Agreement, p. 2 last 4 lines, p. 3, last 2 para, p. 4, Proposal 1, p. 3, Timing mode, p. 3 first full para, p. 3 second line, p. 3 second full para, p. 4 section 2.2, second para.

International Search Report and Written Opinion—PCT/US2022/074474—ISA/EPO—Jan. 4, 2023.

* cited by examiner

SIGNALING ENHANCEMENTS FOR SIMULTANEOUS MULTIPLEXING IN AN INTEGRATED ACCESS AND BACKHAUL NETWORK

FIELD OF THE DISCLOSURE

Aspects of the present disclosure generally relate to wireless communication and specifically, to signaling enhancements for simultaneous multiplexing in an integrated access and backhaul (IAB) network.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different UEs to communicate on a municipal, national, regional, or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

In an integrated access and backhaul (IAB) network, an IAB node may include a mobile termination function (IAB-MT) configured to communicate with a parent node via a parent link, and the IAB node may further include a distributed unit (IAB-DU) configured to communicate with a child node via a child link. For example, the parent link may be a wireless backhaul link used to communicate with a parent IAB node or an IAB donor, and the child link may be a wireless backhaul link used to communicate with a child IAB node or a wireless access link used to communicate with a served UE. In typical operation, time division multiplexing (TDM) is used between the parent (backhaul) link and the child link, whereby an IAB node may transmit or receive via either the parent link or the child link (but not both) in a given frame, slot, or other time resource.

In some cases, an IAB node may have an enhanced duplex capability that supports simultaneous operation over the parent link and the child link. For example, the simultaneous operation may include a simultaneous half-duplex operation in which the IAB-MT and the IAB-DU simultaneously transmit over the parent link and the child link, respectively, or simultaneously receive over the parent link and the child link, respectively. As another example, the simultaneous operation may include a simultaneous full-duplex operation in which the IAB-MT transmits or receives over the parent link while the IAB-DU receives or transmits, respectively, over the child link. In this way, an IAB node may support one or more simultaneous multiplexing modes to reduce latency, enhance spectral efficiency, or enable more efficient resource utilization, among other examples. However, simultaneous operation poses various challenges, including a need to appropriately configure an IAB-MT and IAB-DU beam pair that has sufficient spatial separation or other beam-specific characteristics to limit inter-link interference or self-interference.

SUMMARY

Some aspects described herein relate to a method of wireless communication performed by a parent node. The method may include determining, for a distributed unit (DU) of an integrated access and backhaul (IAB) node (IAB-DU), a set of restricted IAB-DU beams that are not to be used by the IAB-DU while a mobile termination function (MT) of the IAB node (IAB-MT) is using one or more IAB-MT beams, the determination of the set of restricted IAB-DU beams being based at least in part on one or more measurements related to interference caused by the IAB-DU and the IAB-MT performing a simultaneous operation in one or more simultaneous multiplexing modes. The method may include transmitting, to the IAB node, signaling that indicates the set of restricted IAB-DU beams and associates the set of restricted IAB-DU beams with the one or more IAB-MT beams.

Some aspects described herein relate to a method of wireless communication performed by a parent node. The method may include receiving, from an IAB node that includes an IAB-DU and an IAB-MT, signaling that indicates one or more beam-specific parameters related to a multiplexing capability for a beam pair that includes an IAB-MT beam and an IAB-DU beam associated with the IAB-MT beam. The method may include transmitting, to the IAB node, one or more scheduling parameters for the IAB-MT based at least in part on the signaling that indicates the one or more beam-specific parameters.

Some aspects described herein relate to a method of wireless communication performed by an IAB node that includes an IAB-DU and an IAB-MT. The method may include receiving, from a parent node based at least in part on one or more measurements related to interference caused by the IAB-DU and the IAB-MT performing a simultaneous operation in one or more simultaneous multiplexing modes, signaling that indicates a set of restricted IAB-DU beams that are not to be used by the IAB-DU while the IAB-MT is using one or more IAB-MT beams, the signaling associating the set of restricted IAB-DU beams with the one or more IAB-MT beams. The method may include performing, by the IAB-MT, a first transmit or receive operation using an IAB-MT beam included in the one or more IAB-MT beams that are associated with the set of restricted IAB-DU beams. The method may include performing, by the IAB-DU simultaneously with the first transmit or receive operation, a second transmit or receive operation using an IAB-DU beam that is not included in the set of restricted IAB-DU beams.

Some aspects described herein relate to a method of wireless communication performed by an IAB node that includes an IAB-DU and an IAB-MT. The method may include transmitting, to a parent node, signaling that indicates one or more beam-specific parameters related to a multiplexing capability for a beam pair that includes an IAB-MT beam and an IAB-DU beam associated with the IAB-MT beam. The method may include receiving, from the parent node, one or more scheduling parameters for the IAB-MT based at least in part on the signaling that indicates the one or more beam-specific parameters.

Some aspects described herein relate to a parent node for wireless communication. The parent node may include at least one processor and at least one memory, communicatively coupled with the at least one processor, that stores processor-readable code. The processor-readable code, when executed by the at least one processor, may be configured to cause the parent node to determine, for a distributed unit of an IAB-DU, a set of restricted IAB-DU beams that are not to be used by the IAB-DU while an IAB-MT is using one or more IAB-MT beams, the determination of the set of restricted IAB-DU beams being based at least in part on one or more measurements related to interference caused by the IAB-DU and the IAB-MT performing a simultaneous operation in one or more simultaneous multiplexing modes. The processor-readable code, when executed by the at least one processor, may be configured to cause the parent node to transmit, to the IAB node, signaling that indicates the set of restricted IAB-DU beams and associates the set of restricted IAB-DU beams with the one or more IAB-MT beams.

Some aspects described herein relate to a parent node for wireless communication. The parent node may include at least one processor and at least one memory, communicatively coupled with the at least one processor, that stores processor-readable code. The processor-readable code, when executed by the at least one processor, may be configured to cause the parent node to receive, from an IAB node that includes an IAB-DU and an IAB-MT, signaling that indicates one or more beam-specific parameters related to a multiplexing capability for a beam pair that includes an IAB-MT beam and an IAB-DU beam associated with the IAB-MT beam. The processor-readable code, when executed by the at least one processor, may be configured to cause the parent node to transmit, to the IAB node, one or more scheduling parameters for the IAB-MT based at least in part on the signaling that indicates the one or more beam-specific parameters.

Some aspects described herein relate to an IAB node for wireless communication. The IAB node may include at least one processor and at least one memory, communicatively coupled with the at least one processor, that stores processor-readable code. The processor-readable code, when executed by the at least one processor, may be configured to cause the IAB node to receive, from a parent node based at least in part on one or more measurements related to interference caused by an IAB-DU and an IAB-MT performing a simultaneous operation in one or more simultaneous multiplexing modes, signaling that indicates a set of restricted IAB-DU beams that are not to be used by the IAB-DU while the IAB-MT is using one or more IAB-MT beams, the signaling associating the set of restricted IAB-DU beams with the one or more IAB-MT beams. The processor-readable code, when executed by the at least one processor, may be configured to cause the IAB node to perform a first transmit or receive operation using an IAB-MT beam included in the one or more IAB-MT beams that are associated with the set of restricted IAB-DU beams. The processor-readable code, when executed by the at least one processor, may be configured to cause the IAB node to perform a second transmit or receive operation using an IAB-DU beam that is not included in the set of restricted IAB-DU beams.

Some aspects described herein relate to an IAB node for wireless communication. The IAB node may include at least one processor and at least one memory, communicatively coupled with the at least one processor, that stores processor-readable code. The processor-readable code, when executed by the at least one processor, may be configured to cause the IAB node to transmit, to a parent node, signaling that indicates one or more beam-specific parameters related to a multiplexing capability for a beam pair that includes an IAB-MT beam and an IAB-DU beam associated with the IAB-MT beam. The processor-readable code, when executed by the at least one processor, may be configured to cause the IAB node to receive, from the parent node, one or more scheduling parameters for the IAB-MT based at least in part on the signaling that indicates the one or more beam-specific parameters.

Some aspects described herein relate to a non-transitory computer-readable medium that stores a set of instructions for wireless communication by a parent node. The set of instructions, when executed by one or more processors of the parent node, may cause the parent node to determine, for an IAB-DU, a set of restricted IAB-DU beams that are not to be used by the IAB-DU while an IAB-MT is using one or more IAB-MT beams, the determination of the set of restricted IAB-DU beams being based at least in part on one or more measurements related to interference caused by the IAB-DU and the IAB-MT performing a simultaneous operation in one or more simultaneous multiplexing modes. The set of instructions, when executed by one or more processors of the parent node, may cause the parent node to transmit, to the IAB node, signaling that indicates the set of restricted IAB-DU beams and associates the set of restricted IAB-DU beams with the one or more IAB-MT beams.

Some aspects described herein relate to a non-transitory computer-readable medium that stores a set of instructions for wireless communication by a parent node. The set of instructions, when executed by one or more processors of the parent node, may cause the parent node to receive, from an IAB node that includes an IAB-DU and an IAB-MT, signaling that indicates one or more beam-specific parameters related to a multiplexing capability for a beam pair that includes an IAB-MT beam and an IAB-DU beam associated with the IAB-MT beam. The set of instructions, when executed by one or more processors of the parent node, may cause the parent node to transmit, to the IAB node, one or more scheduling parameters for the IAB-MT based at least in part on the signaling that indicates the one or more beam-specific parameters.

Some aspects described herein relate to a non-transitory computer-readable medium that stores a set of instructions for wireless communication by an IAB node. The set of instructions, when executed by one or more processors of the IAB node, may cause the IAB node to receive, from a parent node based at least in part on one or more measurements related to interference caused by an IAB-DU and an IAB-MT performing a simultaneous operation in one or more simultaneous multiplexing modes, signaling that indicates a set of restricted IAB-DU beams that are not to be used by the IAB-DU while the IAB-MT is using one or more IAB-MT beams, the signaling associating the set of restricted IAB-DU beams with the one or more IAB-MT beams. The set of instructions, when executed by one or more processors of the IAB node, may cause the IAB node to perform a first transmit or receive operation using an IAB-MT beam included in the one or more IAB-MT beams that are associated with the set of restricted IAB-DU beams. The set of instructions, when executed by one or more processors of the IAB node, may cause the IAB node to perform a second transmit or receive operation using an IAB-DU beam that is not included in the set of restricted IAB-DU beams.

Some aspects described herein relate to a non-transitory computer-readable medium that stores a set of instructions for wireless communication by an IAB node. The set of instructions, when executed by one or more processors of the IAB node, may cause the IAB node to transmit, to a parent node, signaling that indicates one or more beam-specific parameters related to a multiplexing capability for a beam pair that includes an IAB-MT beam and an IAB-DU beam associated with the IAB-MT beam. The set of instructions, when executed by one or more processors of the IAB node, may cause the IAB node to receive, from the parent node, one or more scheduling parameters for the IAB-MT based at least in part on the signaling that indicates the one or more beam-specific parameters.

Some aspects described herein relate to an apparatus for wireless communication. The apparatus may include means for determining, for an IAB-DU, a set of restricted IAB-DU beams that are not to be used by the IAB-DU while an IAB-MT is using one or more IAB-MT beams, the determination of the set of restricted IAB-DU beams being based at least in part on one or more measurements related to interference caused by the IAB-DU and the IAB-MT performing a simultaneous operation in one or more simultaneous multiplexing modes. The apparatus may include means for transmitting, to the IAB node, signaling that indicates the set of restricted IAB-DU beams and associates the set of restricted IAB-DU beams with the one or more IAB-MT beams.

Some aspects described herein relate to an apparatus for wireless communication. The apparatus may include means for receiving, from an IAB node that includes an IAB-DU and an IAB-MT, signaling that indicates one or more beam-specific parameters related to a multiplexing capability for a beam pair that includes an IAB-MT beam and an IAB-DU beam associated with the IAB-MT beam. The apparatus may include means for transmitting, to the IAB node, one or more scheduling parameters for the IAB-MT based at least in part on the signaling that indicates the one or more beam-specific parameters.

Some aspects described herein relate to an apparatus for wireless communication. The apparatus may include means for receiving, from a parent node based at least in part on one or more measurements related to interference caused by a DU and an MT of the apparatus performing a simultaneous operation in one or more simultaneous multiplexing modes, signaling that indicates a set of restricted DU beams that are not to be used by the DU while the MT is using one or more MT beams, the signaling associating the set of restricted DU beams with the one or more MT beams. The apparatus may include means for performing a first transmit or receive operation using an MT beam included in the one or more MT beams that are associated with the set of restricted DU beams. The apparatus may include means for performing a second transmit or receive operation using a DU beam that is not included in the set of restricted DU beams.

Some aspects described herein relate to an apparatus for wireless communication. The apparatus may include means for transmitting, to a parent node, signaling that indicates one or more beam-specific parameters related to a multiplexing capability for a beam pair that includes an IAB-MT beam and an IAB-DU beam associated with the IAB-MT beam. The apparatus may include means for receiving, from the parent node, one or more scheduling parameters for the IAB-MT based at least in part on the signaling that indicates the one or more beam-specific parameters.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
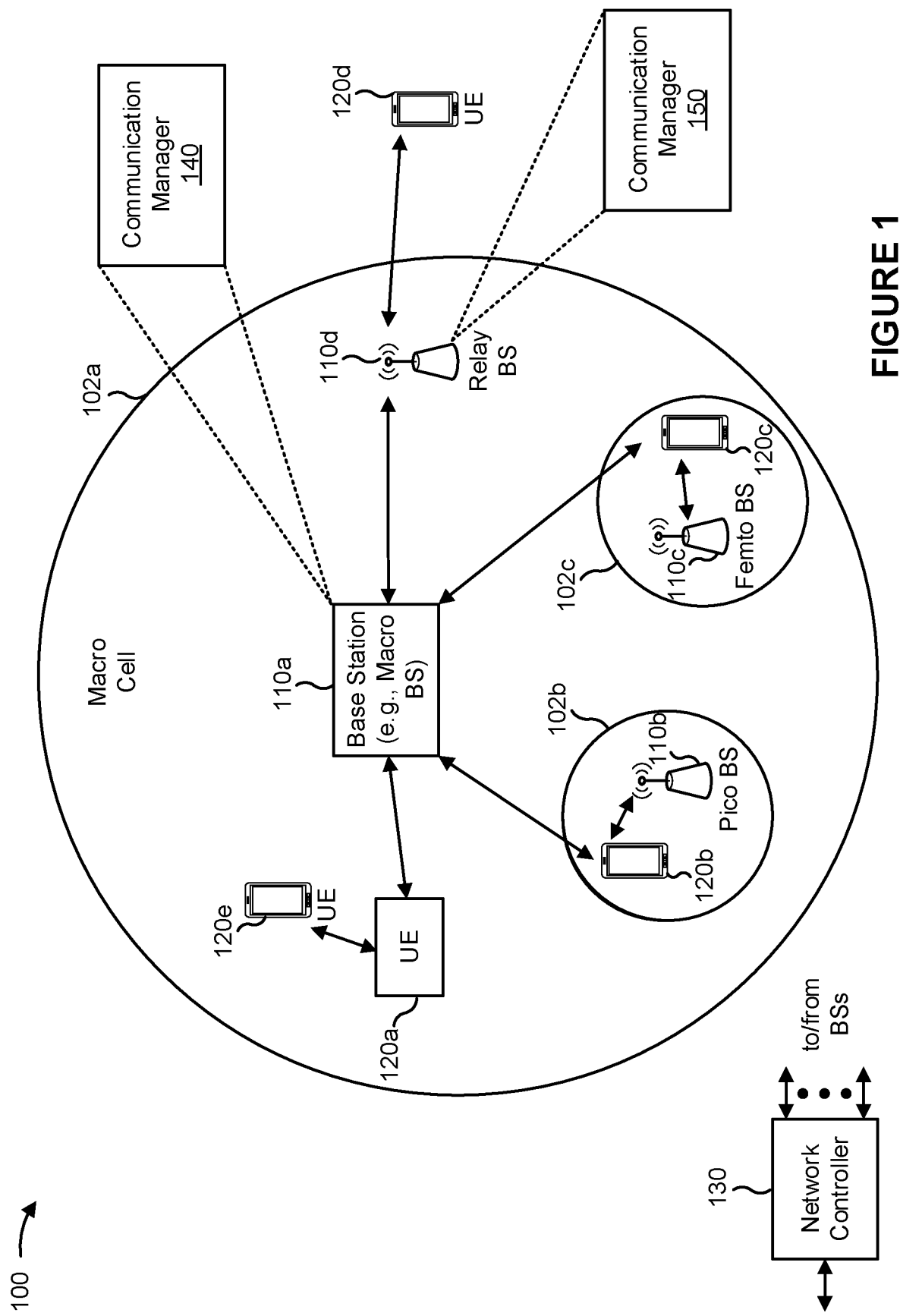
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to signaling that may be used to control one or more multiplexing modes in an integrated access and backhaul (IAB) network, which may include a time division multiplexing (TDM) mode and one or more simultaneous multiplexing modes. Some aspects more specifically relate to techniques in which a parent node in an IAB network may determine whether one or more simultaneous operations (for example, performed in a simultaneous half-duplexing mode or a simultaneous full-duplexing mode) are supported using a beam pair that includes a mobile termination (MT) beam and a distributed unit (DU) beam at an IAB node (which may be respectively referred to herein as an IAB-MT beam and an IAB-DU beam). For example, in some aspects, the parent node may determine whether the IAB-MT beam and the IAB-DU beam support a simultaneous operation based on interference measurements that are obtained at the parent node, the IAB node, or one or more child nodes of the IAB node. Accordingly, based on the interference measurements, the parent node may transmit, to the IAB node, signaling that indicates one or more sets of restricted IAB-DU beams that cannot be used in one or more simultaneous operations. Furthermore, because an MT function of the IAB node (IAB-MT) and a DU of the IAB node (IAB-DU) can include multiple panels to support multiple IAB-MT or IAB-DU beams that may be associated with different levels of inter-link interference or self-interference, the signaling may associate each respective set of restricted IAB-DU beams with one or more IAB-MT beams (for example, IAB-MT beams that experience or cause strong interference when paired with the IAB-DU beams in the associated set of restricted IAB-DU beams in one or more simultaneous multiplexing modes). In addition, because different IAB-MT and IAB-DU beam pairs may have different levels of spatial separation, supported multiplexing modes may vary for different IAB-MT and IAB-DU beam pairs. Accordingly, the IAB node may transmit, to the parent node, signaling that indicates one or more beam-specific characteristics associated with multiplexing capabilities at the IAB node (for example, multiplexing modes that are supported or not supported per IAB-MT and IAB-DU beam pair, a need to switch between different multiplexing modes, requested or restricted IAB-DU beams to be associated with an IAB-MT beam, or resource utilization constraints over one or more IAB-MT beams, among other examples). In some aspects, the parent node may use the beam-specific characteristics associated with the multiplexing capabilities at the IAB node to make scheduling decisions for the IAB-MT.

Particular aspects of the subject matter described in this disclosure can be implemented to realize one or more of the following potential advantages. In some examples, the described techniques can be used to indicate, to an IAB node, an association between a set of restricted beams at an IAB-DU and one or more IAB-MT beams such that different IAB-MT beams may be associated with different sets of restricted IAB-DU beams to mitigate inter-link interference or self-interference that may occur in different simultaneous multiplexing modes. For example, when an IAB node is communicating on a parent link using an IAB-MT beam that is associated with a set of restricted IAB-DU beams, the IAB node may be restricted (for example, prohibited) from simultaneously using any of the IAB-DU beams in the associated set of restricted IAB-DU beams to communicate on a child link. In this way, the association between restricted IAB-DU beams and particular IAB-MT beams may be used to mitigate self-interference that may otherwise be experienced at the IAB node, or to mitigate inter-link interference that may otherwise be experienced at the parent node, the IAB node, or children of the IAB node.

Furthermore, in some examples, the described techniques can be used by an IAB node to indicate, to a parent node or an IAB donor, beam-specific characteristics associated with the multiplexing capabilities at the IAB node. In this way, the parent node may make scheduling decisions for the IAB-MT based on the beam-specific characteristics associated with the multiplexing capabilities at the IAB node, which may include configuring a multiplexing mode that provides sufficient spatial separation to enable simultaneous operation, or configuring time domain resources in a manner that may efficiently utilize simultaneous multiplexing capabilities of the IAB node or provide the IAB node with sufficient time resources to schedule child links of the IAB-DU.

FIG. 1 is a diagram illustrating an example of a wireless network in accordance with the present disclosure. The wireless network 100 may be or may include elements of a 5G (for example, NR) network or a 4G (for example, Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120e), or other network entities. A base station 110 is an entity that communicates with UEs 120. A base station 110 (sometimes referred to as a BS) may include, for example, an NR base station, an LTE base station, a Node B, an eNB (for example, in 4G), a gNB (for example, in 5G), an access point, or a transmission reception point (TRP). Each base station 110 may provide communication coverage for a particular geographic area. In the Third Generation Partnership Project (3GPP), the term "cell" can refer to a coverage area of a base station 110 or a base station subsystem serving this coverage area, depending on the context in which the term is used.

A base station 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station.

The wireless network 100 may be a heterogeneous network that includes base stations 110 of different types, such as macro base stations, pico base stations, femto base stations, or relay base stations. These different types of base stations 110 may have different transmit power levels, different coverage areas, or different impacts on interference in the wireless network 100. For example, macro base stations may have a high transmit power level (for example, 5 to 40 watts) whereas pico base stations, femto base stations, and relay base stations may have lower transmit power levels (for example, 0.1 to 2 watts). In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (for example, three) cells. A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

In some examples, a cell may not necessarily be stationary, and the geographic area of the cell may move in accordance with the location of a base station 110 that is mobile (for example, a mobile base station). In some examples, the base stations 110 may be interconnected to one another or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a base station 110 or a UE 120) and send a transmission of the data to a downstream station (for example, a UE 120 or a base station 110). A relay station may be a UE 120 that can relay transmissions for other UEs 120. In the example shown in FIG. 1, the BS 110d (for example, a relay base station) may communicate with the BS 110a (for example, a macro base station) and the UE 120d in order to facilitate communication between the BS 110a and the UE 120d. A base station 110 that relays communications may be referred to as a relay station, a relay base station, or a relay.

In some aspects, the wireless network 100 may be, may include, or may be included in a wireless backhaul network, sometimes referred to as an integrated access and backhaul (IAB) network. In an IAB network, at least one base station (for example, base station 110a) may be configured as an anchor base station to communicate with a core network via a wired backhaul link, such as a fiber connection. An anchor base station may also be referred to as an IAB donor (or IAB-donor), a central entity, a central unit (CU), or a donor CU, among other examples. An IAB network may include one or more non-anchor base stations, sometimes referred to as relay base stations or IAB nodes (or IAB-nodes). The non-anchor base station (for example, relay base station 110d) may communicate with the anchor base station directly or indirectly (for example, via one or more non-anchor base stations) via one or more backhaul links to form a backhaul path to the core network for carrying backhaul traffic. Backhaul links may be wireless links. The anchor base station(s) or the non-anchor base station(s) may communicate with one or more UEs 120 via access links, which may be wireless links for carrying access traffic.

In some aspects, a radio access network (RAN) that includes an IAB network may utilize millimeter wave technology or directional communications (for example, beamforming or precoding, among other examples) for communications between base stations 110 or UEs 120 (for example, between two base stations 110, between two UEs 120, or between a base station 110 and a UE 120). For example, wireless backhaul links between base stations 110 may use millimeter waves to carry information or may be directed toward a target base station 110 using beamforming, precoding, or other suitable techniques. Similarly, wireless access links between a UE 120 and a base station 110 may use millimeter waves or may be directed toward a target wireless node, such as a UE 120 or a base station 110. In this way, inter-link interference may be reduced.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, or any other suitable device that is configured to communicate via a wireless medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a base station, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any quantity of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the base station 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs in connection with FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz," if used herein, may broadly represent frequencies that may be less than 6 GHz, may be within FR1, or may include mid-band frequencies. Further, unless specifically stated otherwise, it should be understood that the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, a base station, such as base station 110a, may be configured as a parent node in an IAB network and may include a communication manager 140. As described in more detail elsewhere herein, the communication manager 140 may determine, for a distributed unit (DU) of an IAB node (IAB-DU), a set of restricted IAB-DU beams based at least in part on one or more measurements related to interference caused by a simultaneous operation by the IAB-DU and a mobile termination function (MT) of the IAB node (IAB-MT); and transmit, to the IAB node, signaling that indicates the set of restricted IAB-DU beams and associates the set of restricted IAB-DU beams with one or more IAB-MT beams that cannot be used with the set of restricted IAB-DU beams in one or more simultaneous multiplexing modes. Additionally or alternatively, the communication manager 140 may perform one or more other operations described herein.

In some aspects, a base station, such as base station 110d, may be configured as an IAB node in an IAB network and may include a communication manager 150. As described in more detail elsewhere herein, the communication manager 150 may receive, from a parent node based at least in part on one or more measurements related to interference caused by a simultaneous operation by an IAB-DU and an IAB-MT, signaling that indicates a set of restricted IAB-DU beams and associates the set of restricted IAB-DU beams with one or more IAB-MT beams that cannot be used with the set of restricted IAB-DU beams in one or more simultaneous multiplexing modes; perform a first transmit or receive operation using an IAB-MT beam included in the one or more IAB-MT beams that are associated with the set of restricted IAB-DU beams; and perform a second transmit or receive operation using an IAB-DU beam that is not included in the set of restricted IAB-DU beams. Additionally or alternatively, the communication manager 150 may perform one or more other operations described herein.

Figure 2:
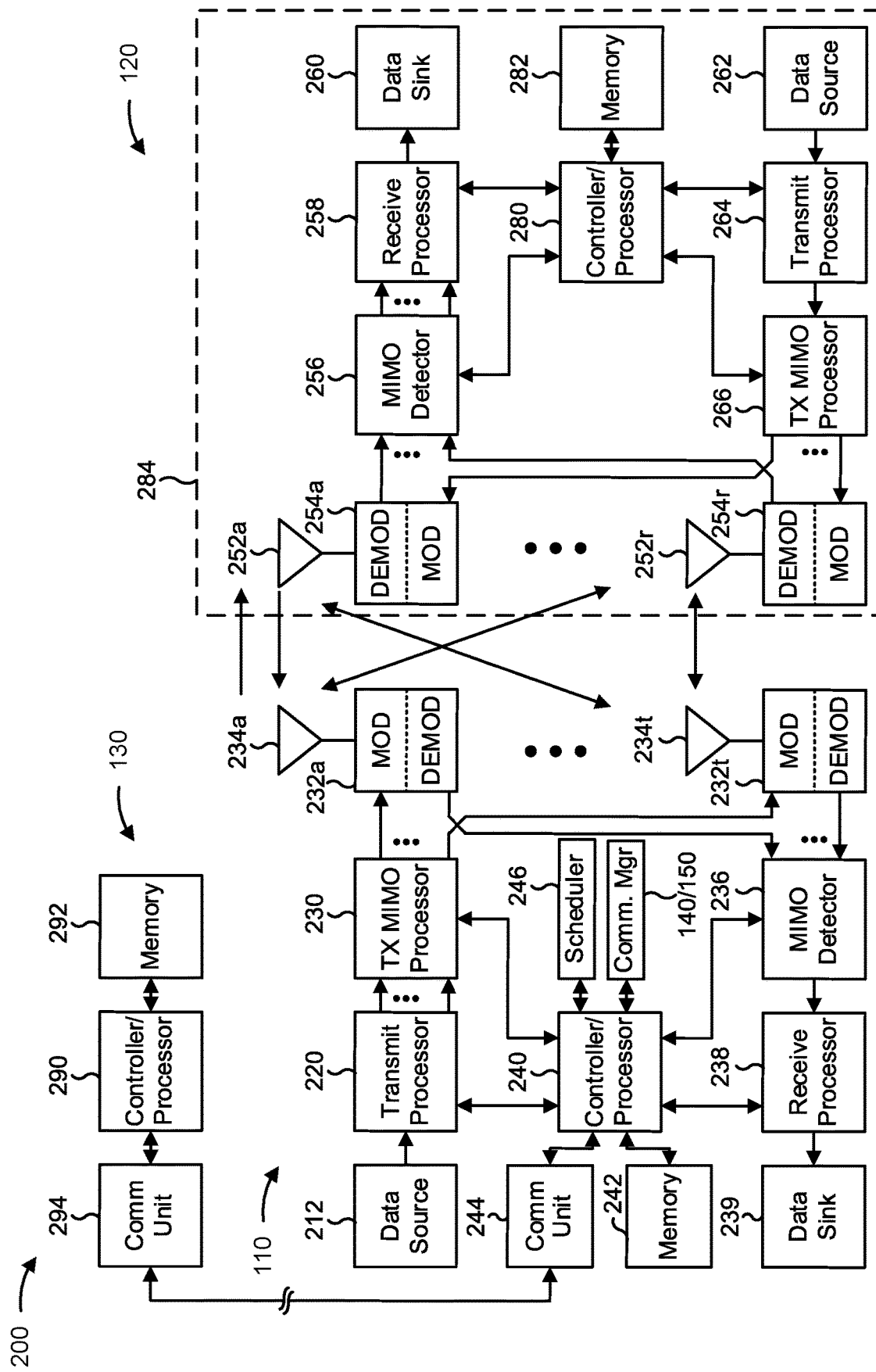
FIG. 2 is a diagram illustrating an example base station in communication with a user equipment (UE) in a wireless network in accordance with the present disclosure.

FIG. 2 is a diagram illustrating an example base station in communication with a UE in a wireless network in accordance with the present disclosure. The base station may correspond to the base station 110 of FIG. 1. Similarly, the UE may correspond to the UE 120 of FIG. 1. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (for example, encode and modulate) the data for the UE 120 based at least in part on the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the base station 110 or other base stations 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM) and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the base station 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the base station 110, the controller/processor 280 of the UE 120, or any other component(s) of FIG. 2 may perform one or more techniques associated with signaling enhancements for simultaneous multiplexing in an IAB network, as described in more detail elsewhere herein. In some aspects, a parent node or an IAB node described herein is the base station 110, is included in the base station 110, or includes one or more components of the base station 110 shown in FIG. 2. For example, the controller/processor 240 of the base station 110, the controller/processor 280 of the UE 120, or any other component(s) of FIG. 2 may perform or direct operations of, for example, process 900 of FIG. 9, process 1000 of FIG. 10, process 1100 of FIG. 11, process 1200 of FIG. 12, or other processes as described herein. The memory 242 and the memory 282 may store data and program codes for the base station 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the base station 110 or the UE 120, may cause the one or more processors, the UE 120, or the base station 110 to perform or direct operations of, for example, process 900 of FIG. 9, process 1000 of FIG. 10, process 1100 of FIG. 11, process 1200 of FIG. 12, or other processes as described herein. In some examples, executing instructions may include running the instructions, converting the instructions, compiling the instructions, or interpreting the instructions, among other examples.

In some aspects, the base station 110 is configured as a parent node and includes means for determining, for a DU of an IAB node (IAB-DU), a set of restricted IAB-DU beams that are not to be used by the IAB-DU while a mobile termination function (MT) of the IAB node (IAB-MT) is using one or more IAB-MT beams, the determination of the set of restricted IAB-DU beams being based at least in part on one or more measurements related to interference caused by the IAB-DU and the IAB-MT performing a simultaneous operation in one or more simultaneous multiplexing modes; or means for transmitting, to the IAB node, signaling that indicates the set of restricted IAB-DU beams and associates the set of restricted IAB-DU beams with the one or more IAB-MT beams. Additionally or alternatively, the parent node includes means for receiving, from an IAB node that includes an IAB-DU and an IAB-MT, signaling that indicates one or more beam-specific parameters related to a multiplexing capability for a beam pair that includes an IAB-MT beam and an IAB-DU beam associated with the IAB-MT beam; or means for transmitting, to the IAB node, one or more scheduling parameters for the IAB-MT based at least in part on the signaling that indicates the one or more beam-specific parameters. In some aspects, the means for the parent node to perform operations described herein may include, for example, one or more of communication manager 140, transmit processor 220, TX MIMO processor 230, modem 232, antenna 234, MIMO detector 236, receive processor 238, controller/processor 240, memory 242, or scheduler 246.

In some aspects, the base station 110 is configured as an IAB node and includes means for receiving, from a parent node based at least in part on one or more measurements related to interference caused by an IAB-DU and an IAB-MT of the IAB node performing a simultaneous operation in one or more simultaneous multiplexing modes, signaling that indicates a set of restricted IAB-DU beams that are not to be used by the IAB-DU while the IAB-MT is using one or more IAB-MT beams, the signaling associating the set of restricted IAB-DU beams with the one or more IAB-MT beams; means for performing, by the IAB-MT, a first transmit or receive operation using an IAB-MT beam included in the one or more IAB-MT beams that are associated with the set of restricted IAB-DU beams; or means for performing, by the IAB-DU simultaneously with the first transmit or receive operation, a second transmit or receive operation using an IAB-DU beam that is not included in the set of restricted IAB-DU beams. Additionally or alternatively, the IAB node includes means for transmitting, to a parent node, signaling that indicates one or more beam-specific parameters related to a multiplexing capability for a beam pair that includes an IAB-MT beam and an IAB-DU beam associated with the IAB-MT beam; or means for receiving, from the parent node, one or more scheduling parameters for the IAB-MT based at least in part on the signaling that indicates the one or more beam-specific parameters. In some aspects, the means for the IAB node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

Figure 3:
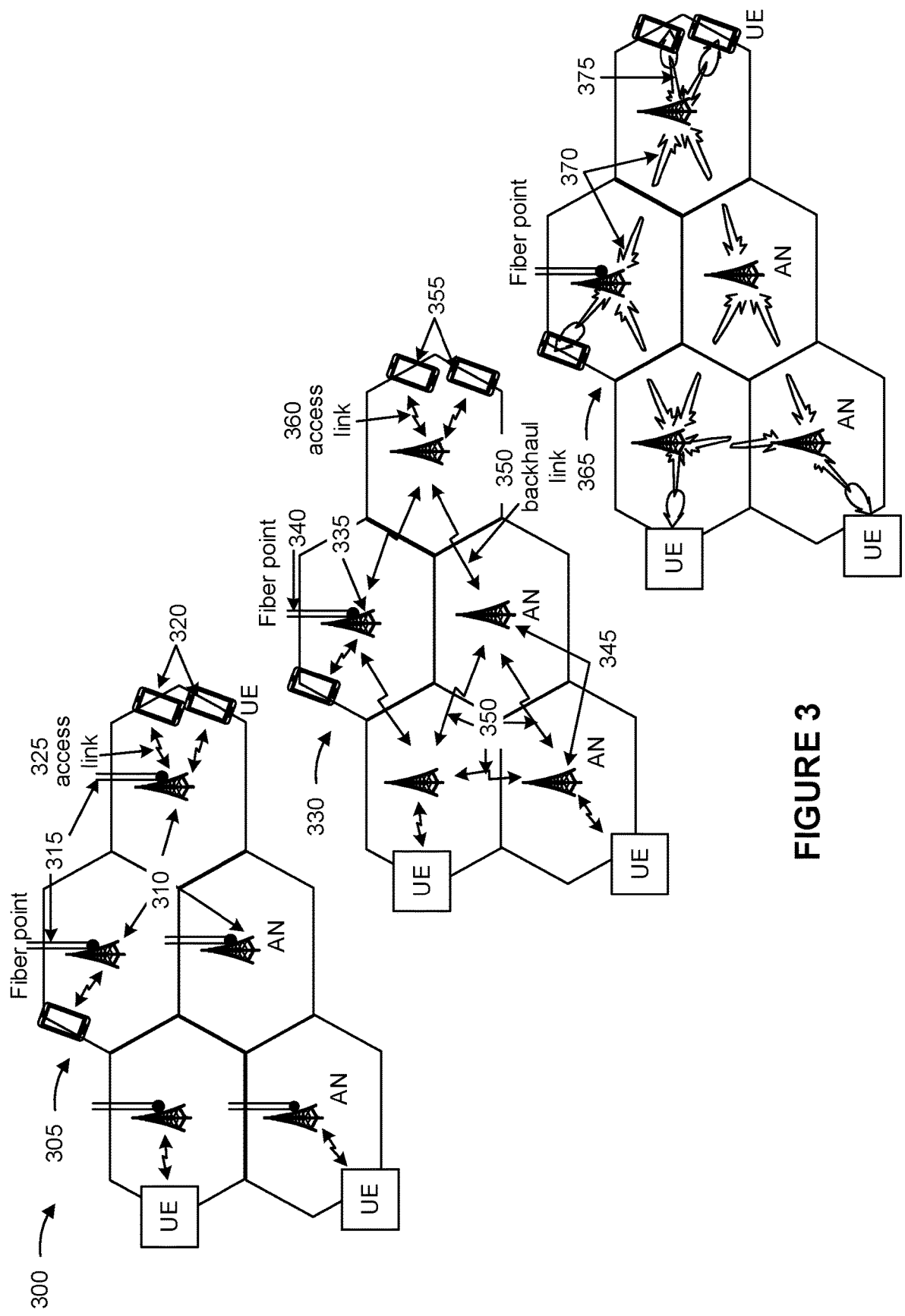
FIG. 3 is a diagram illustrating examples of radio access networks in accordance with the present disclosure.

FIG. 3 is a diagram illustrating examples 300 of RANs, in accordance with the present disclosure. As shown in FIG. 3, a traditional (for example, 3G, 4G, or LTE) RAN 305 may include multiple base stations 310 (for example, access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may be a base station 110 shown in FIG. 1. In some aspects, a UE 320 shown in FIG. 3 may be a UE 120 shown in FIG. 1.

As further shown in FIG. 3, a RAN may include a wireless backhaul network 330, which may be referred to herein as an IAB network 330. In an IAB network 330, at least one base station is an anchor base station 335 that communicates with a core network via a wired backhaul link 340, such as a fiber connection. An anchor base station 335 may also be referred to as an IAB donor (or IAB-donor) or a donor central unit (CU), among other examples. The IAB network 330 may include one or more non-anchor base stations 345, sometimes referred to as relay base stations or IAB nodes (or IAB-nodes). The non-anchor base station 345 may communicate directly or indirectly with the anchor base station 335 via one or more backhaul links 350 (for example, via one or more non-anchor base stations 345) to form a backhaul path to the core network for carrying backhaul traffic. Backhaul link 350 may be a wireless link. Anchor base station(s) 335 or non-anchor base station(s) 345 may communicate with one or more UEs 355 via access links 360, which may be wireless links for carrying access traffic. In some aspects, an anchor base station 335 or a non-anchor base station 345 shown in FIG. 3 may be a base station 110 shown in FIG. 1. In some aspects, a UE 355 shown in FIG. 3 may be a UE 120 shown in FIG. 1.

As further shown in FIG. 3, a RAN may include an IAB network 365 that may utilize millimeter wave technology or directional communications (for example, beamforming) for communications between base stations or UEs (for example, between two base stations, between two UEs, or between a base station and a UE). For example, wireless backhaul links 370 between base stations may use millimeter wave signals to carry information or may be directed toward a target base station using beamforming. Similarly, the wireless access links 375 between a UE and a base station may use millimeter wave signals or may be directed toward a target wireless node (for example, a UE or a base station). In this way, inter-link interference may be reduced.

The configuration of base stations and UEs in FIG. 3 is shown as an example, and other examples are contemplated. For example, one or more base stations illustrated in FIG. 3 may be replaced by one or more UEs that communicate via a UE-to-UE access network (for example, a peer-to-peer network or a device-to-device network). In this case, "anchor node" may refer to a UE that is directly in communication with a base station (for example, an anchor base station or a non-anchor base station).

Figure 4:
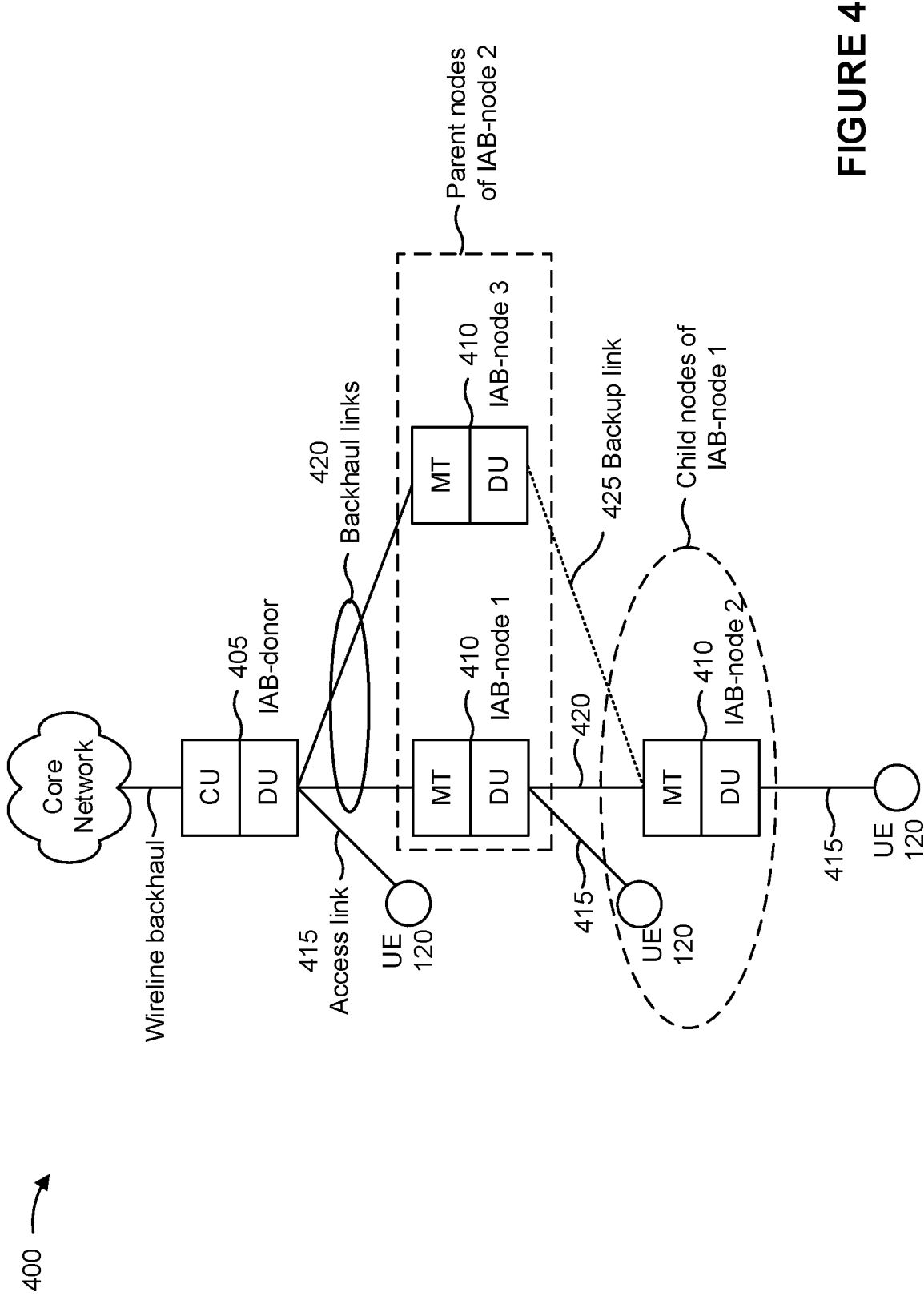
FIG. 4 is a diagram illustrating an example of an integrated access and backhaul (IAB) network architecture in accordance with the present disclosure.

FIG. 4 is a diagram illustrating an example 400 of an IAB network architecture, in accordance with the present disclosure. As shown in FIG. 4, an IAB network may include an IAB donor 405 (shown as IAB-donor) that connects to a core network via a wired connection (shown as a wireline backhaul). For example, an Ng interface of an IAB donor 405 may terminate at a core network. Additionally or alternatively, an IAB donor 405 may connect to one or more devices of the core network that provide a core access and mobility management function (for example, AMF). In some aspects, an IAB donor 405 may include a base station 110, such as an anchor base station, as described above in connection with 3. As shown, an IAB donor 405 may include a central unit (CU), which may perform access node controller (ANC) functions or AMF functions. The CU may configure a distributed unit (DU) of the IAB donor 405 or may configure one or more IAB nodes 410 (for example, an MT or a DU of an IAB node 410) that connect to the core network via the IAB donor 405. Thus, a CU of an IAB donor 405 may control or configure the entire IAB network that connects to the core network via the IAB donor 405, such as by using control messages or configuration messages (for example, a radio resource control (RRC) configuration message or an F1 application protocol (F1-AP) message).

As further shown in FIG. 4, the JAB network may include JAB nodes 410 (shown as IAB-node 1, IAB-node 2, and IAB-node 3) that connect to the core network via the IAB donor 405. As shown, an JAB node 410 may include mobile termination (MT) functions (also sometimes referred to as UE functions (UEF)) and may include DU functions (also sometimes referred to as access node functions (ANF)). The MT functions of an JAB node 410 (for example, a child node) may be controlled or scheduled by another JAB node 410 (for example, a parent node of the child node) or by an IAB donor 405. The DU functions of an JAB node 410 (for example, a parent node) may control or schedule other JAB nodes 410 (for example, child nodes of the parent node) or UEs 120. Thus, a DU may be referred to as a scheduling node or a scheduling component, and an MT may be referred to as a scheduled node or a scheduled component. In some aspects, an IAB donor 405 may include DU functions and not MT functions. That is, an IAB donor 405 may configure, control, or schedule communications of JAB nodes 410 or UEs 120. A UE 120 may include only MT functions, and not DU functions. That is, communications of a UE 120 may be controlled or scheduled by an IAB donor 405 or an JAB node 410 (for example, a parent node of the UE 120).

When a first node controls or schedules communications for a second node (for example, when the first node provides DU functions for the MT functions of the second node), the first node may be referred to as a parent node of the second node, and the second node may be referred to as a child node of the first node. A child node of the second node may be referred to as a grandchild node of the first node. Thus, a DU function of a parent node may control or schedule communications for child nodes of the parent node. A parent node may be an IAB donor 405 or an JAB node 410, and a child node may be an JAB node 410 or a UE 120. Communications of an MT function of a child node may be controlled or scheduled by a parent node of the child node.

As further shown in FIG. 4, a link between a UE 120 (for example, which only has MT functions, and not DU functions) and an IAB donor 405, or between a UE 120 and an JAB node 410, may be referred to as an access link 415. An access link 415 may be a wireless access link that provides a UE 120 with radio access to a core network via an IAB donor 405, and optionally via one or more JAB nodes 410. Thus, the JAB network illustrated in FIG. 4 may be referred to as a multi-hop network or a wireless multi-hop network.

As further shown in FIG. 4, a link between an IAB donor 405 and an IAB node 410 or between two IAB nodes 410 may be referred to as a backhaul link 420. Backhaul link 420 may be a wireless backhaul link that provides an IAB node 410 with radio access to a core network via an IAB donor 405, and optionally via one or more other IAB nodes 410. In an IAB network, network resources for wireless communications (for example, time resources, frequency resources, or spatial resources) may be shared between access links 415 and backhaul links 420. In some aspects, a backhaul link 420 may be a primary backhaul link or a secondary backhaul link (for example, a backup backhaul link). In some aspects, a secondary backhaul link may be used if a primary backhaul link fails, becomes congested, or becomes overloaded, among other examples. For example, a backup link 425 between IAB-node 2 and IAB-node 3 may be used for backhaul communications if a primary backhaul link between IAB-node 2 and IAB-node 1 fails. As used herein, "node" or "wireless node" may refer to an IAB donor 405 or an IAB node 410.

Figure 5:
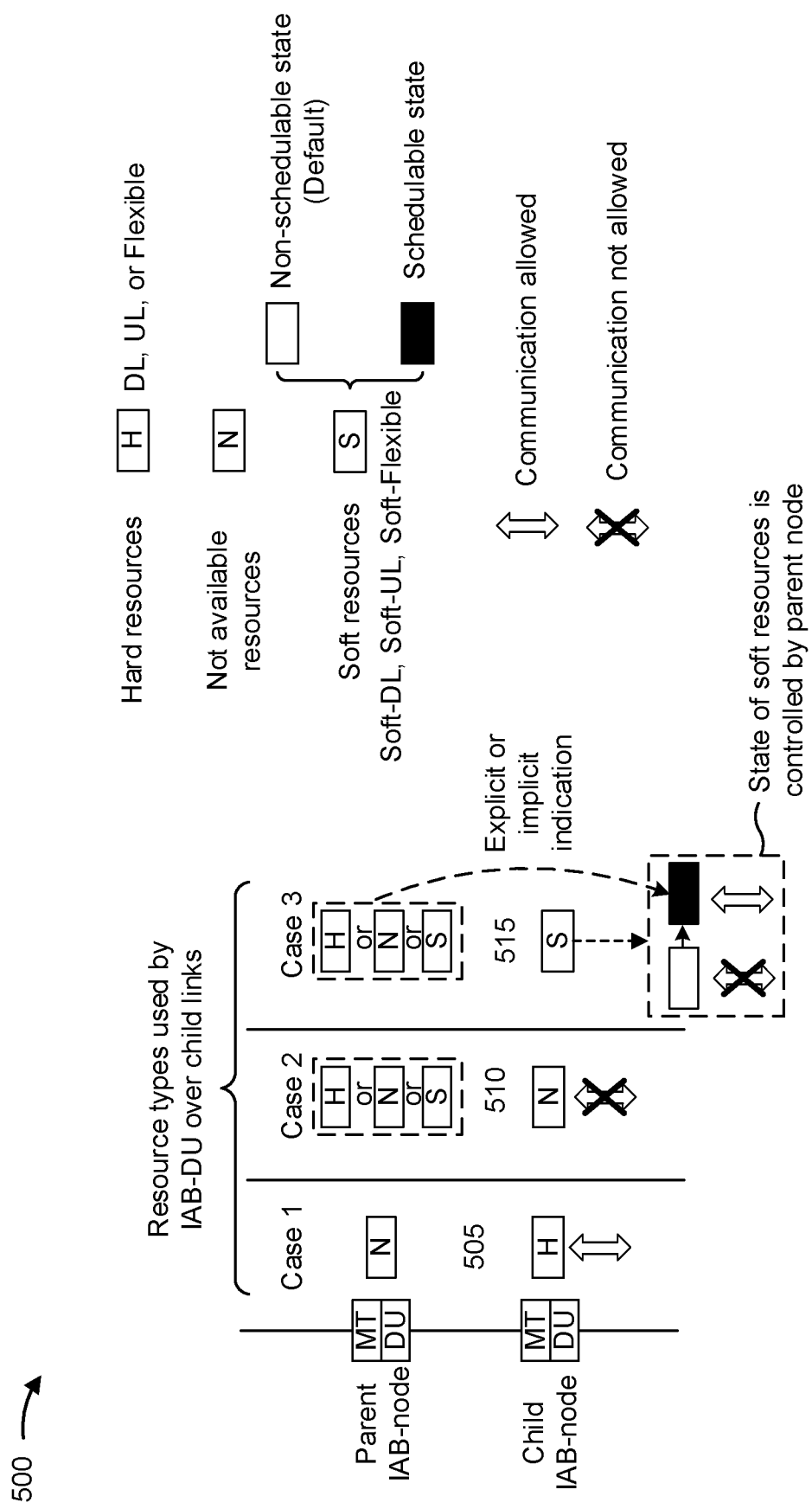
FIG. 5 is a diagram illustrating an example of resource types in an IAB network in accordance with the present disclosure.

FIG. 5 is a diagram illustrating an example 500 of resource types in an IAB network, in accordance with the present disclosure. In an IAB network, time domain resources (sometimes referred to as time resources) may be configured as downlink-only, uplink-only, flexible, or not available (for example, unavailable). When a time resource is configured as downlink-only for a wireless node, the time resource may be available for only downlink communications of the wireless node, and not uplink communications. Similarly, when a time resource is configured as uplink-only for a wireless node, the time resource may be available for only uplink communications of the wireless node, and not downlink communications. When a time resource is configured as flexible for a wireless node, the time resource may be available for both downlink communications and uplink communications of the wireless node. When a time resource is configured as not available for a wireless node, that time resource may not be used for any communications of the wireless node, with possible exceptions for cell-specific signals.

Examples of downlink communications include synchronization signal blocks (SSBs), channel state information reference signals (CSI-RS), physical downlink control channel (PDCCH) communications, or physical downlink shared channel (PDSCH) communications. Examples of uplink communications include physical random access channel (PRACH) communications, physical uplink control channel (PUCCH) communications, physical uplink shared channel (PUSCH) communications, or sounding reference signals (SRSs).

Time resources in an IAB network that are configured as downlink-only, uplink-only, or flexible may be further configured as hard resources or soft resources. When a time resource is configured as a hard resource for a wireless node, that time resource is always available for communications of the wireless node. For example, a hard downlink-only time resource is always available for only downlink communications of the wireless node, a hard uplink-only time resource is always available for only uplink communications of the wireless node, and a hard flexible time resource is always available for uplink and downlink communications of the wireless node.

When a time resource is configured as a soft resource for a wireless node, the availability of that time resource is conditional and dynamically controlled by a parent node of the wireless node. For example, the parent node may indicate (for example, explicitly or implicitly) whether a soft time resource is available for communications of the wireless node. Thus, a soft time resource may be in one of two states: a schedulable state (for example, when the soft time resource is available for scheduling or communications of the wireless node) and a non-schedulable state (for example, when the soft time resource is not available for scheduling and is not available for communications of the wireless node).

For example, a soft downlink-only time resource is only available for downlink communications of the wireless node when a parent node of the wireless node indicates that the soft downlink-only time resource is available. Similarly, a soft uplink-only time resource is only available for uplink communications of the wireless node when a parent node of the wireless node indicates that the soft uplink-only time resource is available. A soft flexible time resource is only available for uplink and downlink communications of the wireless node when a parent node of the wireless node indicates that the soft flexible time resource is available.

As an example, in a first use case 505, a time resource may be configured as a hard resource for a child node, and may be configured as not available for a parent node of the child node. In the first use case 505, the parent node cannot communicate using the time resource, but the child node can schedule communications in the time resource or communicate using the time resource. This configuration may reduce interference between the parent node and the child node or may reduce scheduling conflicts between the parent node and the child node.

As another example, in a second use case 510, a time resource may be configured as not available for the child node, and may be configured as a hard resource, a soft resource, or a not available resource for the parent node (for example, depending on a network configuration, network conditions, or a configuration of a parent node of the parent node). In the second use case 510, the child node cannot schedule communications in the time resource and cannot communicate using the time resource.

As another example, in a third use case 515, a time resource may be configured as a soft resource for the child node, and may be configured as a hard resource, a soft resource, or a not available resource for the parent node (for example, depending on a network configuration, network conditions, or a configuration of a parent node of the parent node). In the third use case 515, the child node cannot schedule or communicate using the time resource unless the child node receives an indication (for example, a release indication), from the parent node (for example, explicitly or implicitly), that the time resource is available (for example, released) for use by the child node. If the child node receives such an indication, then the child node can schedule communications in the time resource or communicate using the time resource.

Figure 6:
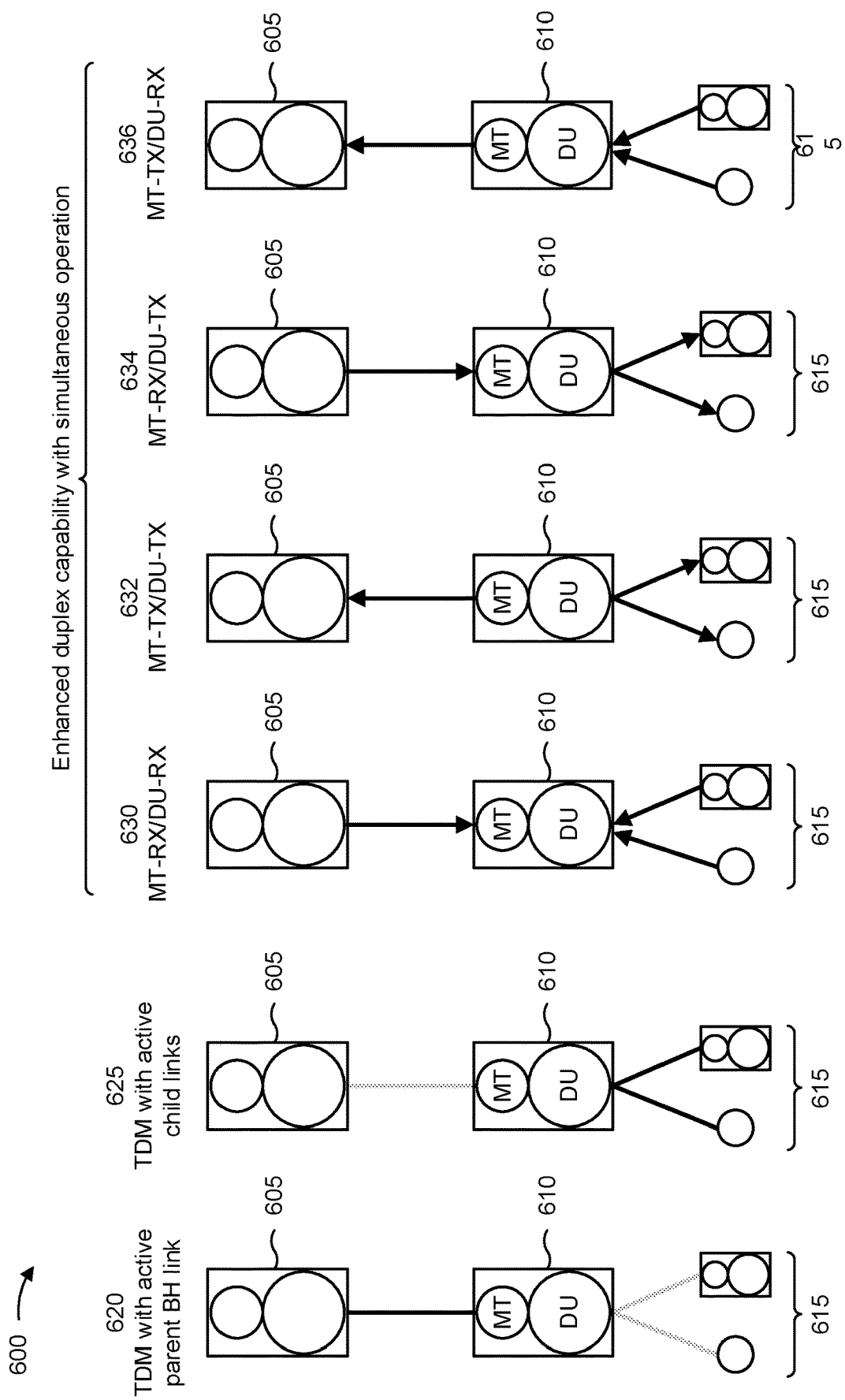
FIG. 6 is a diagram illustrating examples of multiplexing modes in an IAB network in accordance with the present disclosure.

FIG. 6 is a diagram illustrating examples 600 of multiplexing modes in an IAB network in accordance with the present disclosure. As shown in FIG. 6, examples 600 include communication between an IAB node 610, a parent node 605 of the IAB node 610 (for example, a parent IAB node or an IAB donor), and one or more child nodes 615 of the IAB node 610 (for example, a child IAB node or a UE). As further shown, the IAB node 610 may include an MT function (which may be referred to herein as an IAB-MT) that communicates with the parent node 605 via a parent link (for example, a wireless backhaul link) and a DU (which may be referred to herein as an IAB-DU) that communicates with the child node(s) 615 via one or more respective child links (for example, a wireless backhaul link in cases where the child node 615 is a child IAB node, or a wireless access link in cases where the child node 615 is a child UE). As shown in FIG. 6, the parent node 605 may be a parent IAB node that includes an MT and a DU. Alternatively, in some cases, the parent node 605 may be an IAB donor that includes a DU to schedule the MT of the IAB node 610 and a CU to configure and control an entire IAB network that connects to a core network through the parent node 605. In some aspects, the parent node 605, the IAB node 610, and the child node(s) 615 may be included in an IAB network, such as any one or more of wireless network 100 or IAB networks 330, 365, 400 described in further detail above.

In general, the IAB node 610 may support at least a time division multiplexing (TDM) mode in which time resources (for example, frames or slots) are allocated to either the parent link of the IAB node 610 or the child links of the IAB node 610. In other words, when communicating in the TDM mode, the IAB node 610 may either communicate with the parent node 605 via the parent link or with one or more child nodes 615 via one or more child links in a given transmission time interval. For example, in a first TDM operation 620, a parent (backhaul) link is active such that the IAB node 610 may perform a transmission to the parent node 605 or receive a transmission from the parent node 605, and the child links are inactive such that no communication occurs over the child links while the IAB node 610 is communicating over the parent link. In another example, in a second TDM operation 625, the child links are active such that the IAB node 610 may perform a transmission to a child node 615 or receive a transmission from a child node 615, and the parent link is inactive such that no communication occurs over the parent link while the IAB node 610 is communicating over the child link(s).

Furthermore, in some cases, the IAB node 610 may have an enhanced duplex capability that supports simultaneous operation over the parent link and the child link (for example, using spatial division multiplexing (SDM)). For example, a first simultaneous half-duplex operation 630 may be an MT-RX/DU-RX operation in which the IAB-MT receives a transmission from the parent node 605 on the parent link and the IAB-DU simultaneously receives a transmission from one or more child nodes 615 over one or more respective child links. As further shown in FIG. 6, a second simultaneous half-duplex operation 632 may be an MT-TX/DU-TX operation in which the IAB-MT performs a transmission to the parent node 605 on the parent link and the IAB-DU simultaneously performs a transmission to one or more child nodes 615 over one or more respective child links. As further shown in FIG. 6, a first simultaneous full-duplex operation 634 may be an MT-RX/DU-TX operation in which the IAB-MT receives a transmission from the parent node 605 on the parent link and the IAB-DU simultaneously performs a transmission to one or more child nodes 615 over one or more respective child links. In another example, a second simultaneous full-duplex operation 636 may be an MT-RX/DU-RX operation in which the IAB-MT performs a transmission to the parent node 605 on the parent link and the IAB-DU simultaneously receives a transmission from one or more child nodes 615 over one or more respective child links.

In this way, the IAB node 610 may support one or more simultaneous multiplexing modes to reduce latency, enhance spectral efficiency, or enable more efficient resource utilization, among other examples. For example, utilizing simultaneous half-duplex or simultaneous full-duplex communication may reduce latency by allowing the IAB node 610 to transmit or receive a downlink signal in an uplink-only slot, or to transmit or receive an uplink signal in a downlink-only slot. In addition, simultaneous multiplexing modes may enhance spectral efficiency or throughput or enable more efficient resource utilization by simultaneously utilizing time resources to communicate via the parent link and the child link(s). However, simultaneous multiplexing modes pose various challenges, including a need to appropriately configure an IAB-MT and IAB-DU beam pair that has sufficient spatial separation or other beam-specific characteristics to limit inter-link interference or self-interference. For example, in a simultaneous multiplexing mode, the IAB node 610 may be restricted from using certain IAB-MT or IAB-DU beams or beam pairs that may result in inter-link interference or self-interference. For example, in some cases, a beam pair that includes an IAB-MT beam and an IAB-DU beam may not provide sufficient spatial separation if the IAB-MT beam and the IAB-DU beam cause inter-link interference or self-interference, which may occur when the IAB-MT beam and the IAB-DU beam are associated with the same antenna panel or a signal transmitted over the IAB-MT beam interferes with reception of a signal transmitted over the IAB-DU beam, or vice versa. Accordingly, whether the IAB node 610 can use an enhanced duplexing mode such as simultaneous half-duplexing or simultaneous full-duplexing may be dependent on selecting and appropriately configuring or scheduling communication via an IAB-MT beam, an IAB-DU beam, or an IAB-MT and IAB-DU beam pair in a manner that may reduce or minimize inter-link interference or self-interference via spatial isolation, or efficiently utilize time and frequency resources.

Various aspects relate generally to signaling that may be used to control one or more multiplexing modes in an IAB network, which may include a TDM mode and one or more simultaneous multiplexing modes. Some aspects more specifically relate to techniques in which a parent node in an IAB network may determine whether one or more simultaneous operations (for example, performed in a simultaneous half-duplexing mode or a simultaneous full-duplexing mode) are supported using a beam pair that includes an MT beam and a DU beam at an IAB node (which may be respectively referred to herein as an IAB-MT beam and an IAB-DU beam). For example, the parent node may determine whether the IAB-MT beam and the IAB-DU beam support a simultaneous operation based on interference measurements that are obtained at the parent node, the IAB node, or one or more child nodes of the IAB node. Accordingly, based on the interference measurements, the parent node may transmit, to the IAB node, signaling that indicates one or more sets of restricted IAB-DU beams that cannot be used in one or more simultaneous operations. Furthermore, because an IAB-MT and an IAB-DU can include multiple panels to support multiple IAB-MT or IAB-DU beams that may be associated with different levels of inter-link interference or self-interference, the signaling may associate each respective set of restricted IAB-DU beams with one or more IAB-MT beams (for example, IAB-MT beams that experience or cause strong interference when paired with the IAB-DU beams in the associated set of restricted IAB-DU beams in one or more simultaneous multiplexing modes). In addition, because different IAB-MT and IAB-DU beam pairs may have different levels of spatial separation, supported multiplexing modes may vary for different IAB-MT and IAB-DU beam pairs. Accordingly, the IAB node may transmit, to the parent node, signaling that indicates one or more beam-specific characteristics associated with multiplexing capabilities at the IAB node (for example, multiplexing modes that are supported or not supported per IAB-MT and IAB-DU beam pair, a need to switch between different multiplexing modes, requested or restricted IAB-DU beams to be associated with an IAB-MT beam, or resource utilization constraints over one or more IAB-MT beams, among other examples). In some aspects, the parent node may use the beam-specific characteristics associated with multiplexing capabilities at the IAB node to make scheduling decisions for the IAB-MT.

Particular aspects of the subject matter described in this disclosure can be implemented to realize one or more of the following potential advantages. In some examples, the described techniques can be used to indicate, to an IAB node, an association between a set of restricted beams at an IAB-DU and one or more IAB-MT beams such that different IAB-MT beams may be associated with different sets of restricted IAB-DU beams to mitigate inter-link interference or self-interference that may occur in different simultaneous multiplexing modes. For example, when an IAB node is communicating on a parent link using an TAB-MT beam that is associated with a set of restricted TAB-DU beams, the TAB node may be restricted (for example, prohibited) from simultaneously using any of the TAB-DU beams in the associated set of restricted TAB-DU beams to communicate on a child link. In this way, the association between restricted TAB-DU beams and particular TAB-MT beams may be used to mitigate self-interference that may otherwise be experienced at the TAB node, or to mitigate inter-link interference that may otherwise be experienced at the parent node, the TAB node, or children of the TAB node.

Furthermore, in some examples, the described techniques can be used by an TAB node to indicate, to a parent node or an IAB donor, beam-specific characteristics associated with the multiplexing capabilities at the TAB node. In this way, the parent node may make scheduling decisions for the TAB-MT based on the beam-specific characteristics associated with the multiplexing capabilities at the TAB node, which may include configuring a multiplexing mode that provides sufficient spatial separation to enable simultaneous operation, or configuring time domain resources in a manner that may efficiently utilize simultaneous multiplexing capabilities of the TAB node or provide the TAB node with sufficient time resources to schedule child links of the IAB-DU.

Figure 7:
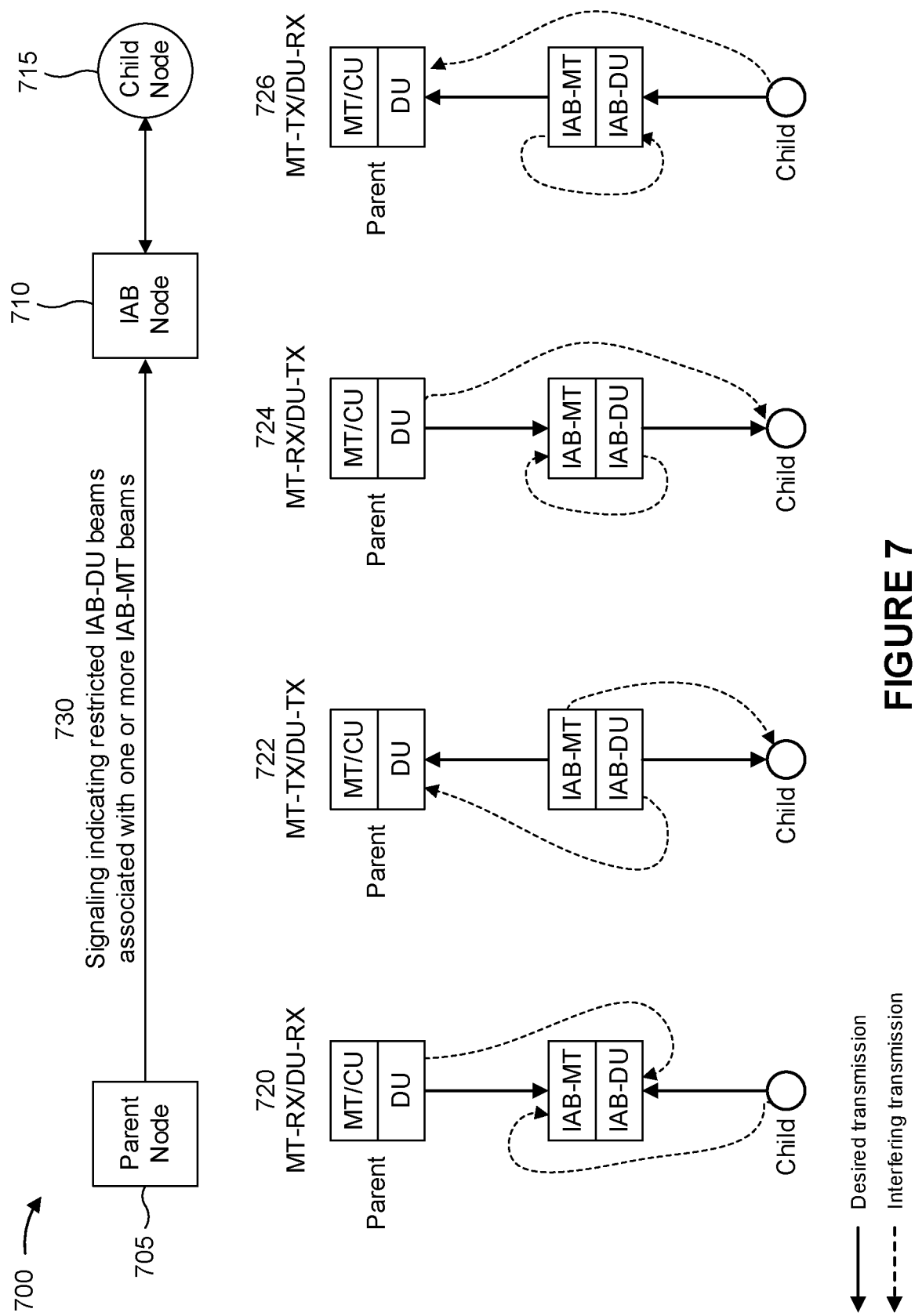
FIGS. 7-8 are diagrams illustrating examples associated with signaling enhancements for simultaneous multiplexing in an IAB network in accordance with the present disclosure.

FIG. 7 is a diagram illustrating an example 700 associated with signaling enhancements for simultaneous multiplexing in an TAB network in accordance with the present disclosure. As shown in FIG. 7, example 700 includes communication between an TAB node 710, a parent node 705 of the TAB node 710 (for example, a parent TAB node or an IAB donor), and one or more child nodes 715 of the TAB node 710 (for example, a child TAB node or a UE). As further shown, the TAB node 710 may include an TAB-MT that communicates with the parent node 705 via a parent link an IAB-DU that communicates with the child node(s) 715 via one or more respective child links (for example, a wireless backhaul link in cases where the child node 715 is a child TAB node or a wireless access link in cases where the child node 715 is a child UE. In some aspects, the parent node 705 may be a parent TAB node that includes an MT and a DU, or the parent node 705 may be an IAB donor that includes a DU to schedule the TAB-MT and a CU to configure and control an entire TAB network that connects to a core network through the parent node 705. In some aspects, the parent node 705, the TAB node 710, and the child node(s) 715 may be included in an TAB network, such as any one or more of wireless network 100 or TAB networks 330, 365, 400 described in further detail above.

In some aspects, the IAB node 710 may support communication on the parent link and the child links using a TDM configuration, where either the parent link or the child links are active in any given transmission time interval. For example, as described in further detail above with reference to FIG. 5, the parent node 705 may configure a semi-static time division duplexing (TDD) pattern in which each respective time resource is configured as a downlink-only resource, an uplink-only resource, a flexible resource, or a not available resource, and further in which each downlink-only resource, uplink-only resource, or flexible resource is configured as a hard resource or a soft resource. Additionally or alternatively, the parent node 705 may provide a dynamic indication to configure the parent link or the child links of the IAB node 710 such that only one link is active in a given transmission time interval. Furthermore, in some cases, the IAB node 710 may support one or more simultaneous multiplexing modes, as described above with reference to FIG. 6. In general, when the IAB node 710 communicates in a simultaneous multiplexing mode, the parent link of the IAB node 710 and the child links of the IAB node 710 may be active in the same transmission time interval, which can result in inter-link interference or self-interference.

For example, in a first simultaneous multiplexing operation 720 (for example, in an MT-RX/DU-RX simultaneous half-duplexing mode), the IAB node 710 may receive a desired transmission from the parent node 705 on the parent link via an IAB-MT beam and may simultaneously receive a desired transmission from one or more child nodes 715 on one or more respective child links via one or more IAB-DU beams. However, in some cases, the desired transmission via the IAB-MT beam may be received at the IAB-DU, which may cause inter-link interference with respect to reception of the desired transmission via the IAB-DU beam. Furthermore, as shown, the desired transmission via the IAB-DU beam may be received at the IAB-MT, which may cause inter-link interference with respect to reception of the desired transmission via the IAB-MT beam. In another example, in a second simultaneous multiplexing operation 722 (for example, in an MT-TX/DU-TX simultaneous half-duplexing mode), the IAB node 710 may perform a desired transmission to the parent node 705 on the parent link via an IAB-MT beam and may simultaneously perform a desired transmission to one or more child nodes 715 on one or more respective child links via one or more IAB-DU beams. In such cases, the desired transmission via the IAB-MT beam may be received at one or more of the child nodes 715, which may cause inter-link interference with respect to reception of the desired transmission via the IAB-DU beam. Furthermore, as shown, the desired transmission via the IAB-DU beam may be received at the parent node 705, which may cause inter-link interference with respect to reception of the desired transmission via the IAB-MT beam.

Furthermore, in cases where the IAB node 710 supports a full-duplexing mode, where the IAB node 710 transmits and receives in the same transmission time interval, another challenge that may arise is self-interference caused by the simultaneous transmission and reception. For example, self-interference may occur when a transmitted signal leaks into a receive port (for example, leakage from a first panel configured for transmission into a second panel configured for reception) or when an object in an environment surrounding the IAB node 710 reflects a transmitted signal back to a receive port (for example, causing a clutter echo effect). For example, in a third simultaneous multiplexing operation 724 (for example, in an MT-RX/DU-TX full-duplexing mode), the IAB node 710 may receive a desired transmission from the parent node 705 on the parent link via an IAB-MT beam and may simultaneously perform a desired transmission to one or more child nodes 715 on one or more respective child links via one or more IAB-DU beams. In such cases, the desired transmission via the IAB-MT beam may be received at one or more of the child nodes 715, which may cause inter-link interference with respect to reception of the desired transmission via the IAB-DU beam, and the desired transmission via the IAB-DU beam may be received at the IAB-MT, which may cause self-link interference with respect to reception of the desired transmission via the IAB-MT beam. In another example, in a fourth simultaneous multiplexing operation 726 (for example, in an MT-TX/DU-RX full-duplexing mode), the IAB node 710 may receive a desired transmission from one or more child nodes 715 on the child links via one or more IAB-DU beams and may simultaneously perform a desired transmission to the parent node 705 on the parent link via an IAB-MT beams. In such cases, the desired transmission via the IAB-DU beam may be received at the parent node 705, which may cause inter-link interference with respect to reception of the desired transmission via the IAB-MT beam, and the desired transmission via the IAB-MT beam may be received at the IAB-DU, which may cause self-link interference with respect to reception of the desired transmission via the IAB-DU beam.

Accordingly, in some aspects, in an operation 730, the parent node 705 may transmit, to the IAB node 710, signaling that indicates a set of one or more IAB-DU restricted beams, which may generally refer to a set of beams that the IAB-DU is restricted from using to communicate with the child nodes 715 in one or more simultaneous multiplexing modes. For example, in some aspects, the parent node 705 may determine whether an IAB-MT beam and an IAB-DU beam can be paired with one another in a specific simultaneous operation (for example, the MT-RX/DU-RX simultaneous multiplexing mode 720, the MT-TX/DU-TX simultaneous multiplexing mode 722, the MT-RX/DU-TX simultaneous multiplexing mode 724, or the MT-TX/DU-RX simultaneous multiplexing mode 726). In some aspects, the parent node 705 may generally determine whether the IAB-MT beam and an IAB-DU beam can be paired in simultaneous operation based on interference measurements at one or more of the parent node 705, the IAB node 710, or the child nodes 715. For example, in some aspects, the parent node 705 may perform interference measurements related to inter-link interference caused by a desired transmission via an IAB-DU beam, may receive a measurement report that includes interference measurements obtained at the IAB node 710 related to inter-link interference or self-interference caused by a desired transmission via an IAB-MT beam or an IAB-DU beam, or may receive a measurement report that includes interference measurements obtained at a child node 705 related to inter-link interference caused by a desired transmission via an IAB-MT beam.

In some aspects, based on the interference measurements performed at the parent node 705, the IAB node 710, or the child nodes 715, the parent node 705 may determine whether a given IAB-MT beam and IAB-DU beam can be paired in simultaneous operation (for example, when a simultaneous operation via the IAB-MT beam and IAB-DU beam causes inter-link interference or self-interference that satisfies a threshold), and may determine the set of restricted IAB-DU beams accordingly (for example, an IAB-DU beam may be restricted when a simultaneous operation via the IAB-DU beam and one or more IAB-MT beams causes inter-link interference or self-interference that fails to satisfy the threshold). In other words, a restricted IAB-DU beam may experience or cause inter-link interference or self-interference that fails to satisfy (for example, exceeds) a threshold when paired with one or more IAB-MT beams in a simultaneous multiplexing mode. Furthermore, in some cases, the IAB-MT may support multiple serving beams (for example, different IAB-MT beams) via the parent link (for example, in cases where the IAB-MT includes multiple antenna panels that are spatially isolated). Accordingly, in such cases, an IAB-DU beam may cause interference that fails to satisfy a threshold or is otherwise unsuitable to be paired with a first IAB-MT beam, but the IAB-DU beam may cause interference that satisfies the threshold or is otherwise suitable to be paired with a second IAB-MT beam. In other words, whether an IAB-DU beam can be paired with an IAB-MT beam may be a beam-specific determination, whereby the signaling that indicates the set of restricted IAB-DU beams that cannot be used in a simultaneous operation may be associated with one or more IAB-MT beams. For example, in some aspects, the signaling may include one or more fields that indicate, with respect to a particular set of restricted IAB-DU beams, one or more IAB-MT beams that are associated with the particular set of restricted IAB-DU beams such that the IAB node 710 cannot use any of the restricted IAB-DU beams simultaneously with any of the associated IAB-MT beams. Alternatively, in cases where the signaling that indicates the set of restricted IAB-DU beams omits the one or more fields that indicate the associated IAB-MT beam(s), the set of restricted IAB-DU beams may be associated (for example, implicitly) with all IAB-MT beams. In this case, whenever the IAB node 710 performs a transmit or receive operation using an IAB-MT beam, the IAB node 710 may be restricted from using any of the IAB-DU beams in the set of restricted IAB-DU beams. For example, when the IAB-MT performs a first transmit or receive operation using an IAB-MT beam that is associated with a set of restricted IAB-DU beams, the IAB-DU may perform a simultaneous transmit or receive operation using an IAB-DU that is not included in the set of restricted IAB-DU beams. Furthermore, in some aspects, the signaling may indicate that the set of restricted IAB-DU beams are restricted in one or more simultaneous multiplexing modes or that the association with one or more IAB-MT beams is limited to one or more simultaneous multiplexing modes.

Figure 8:
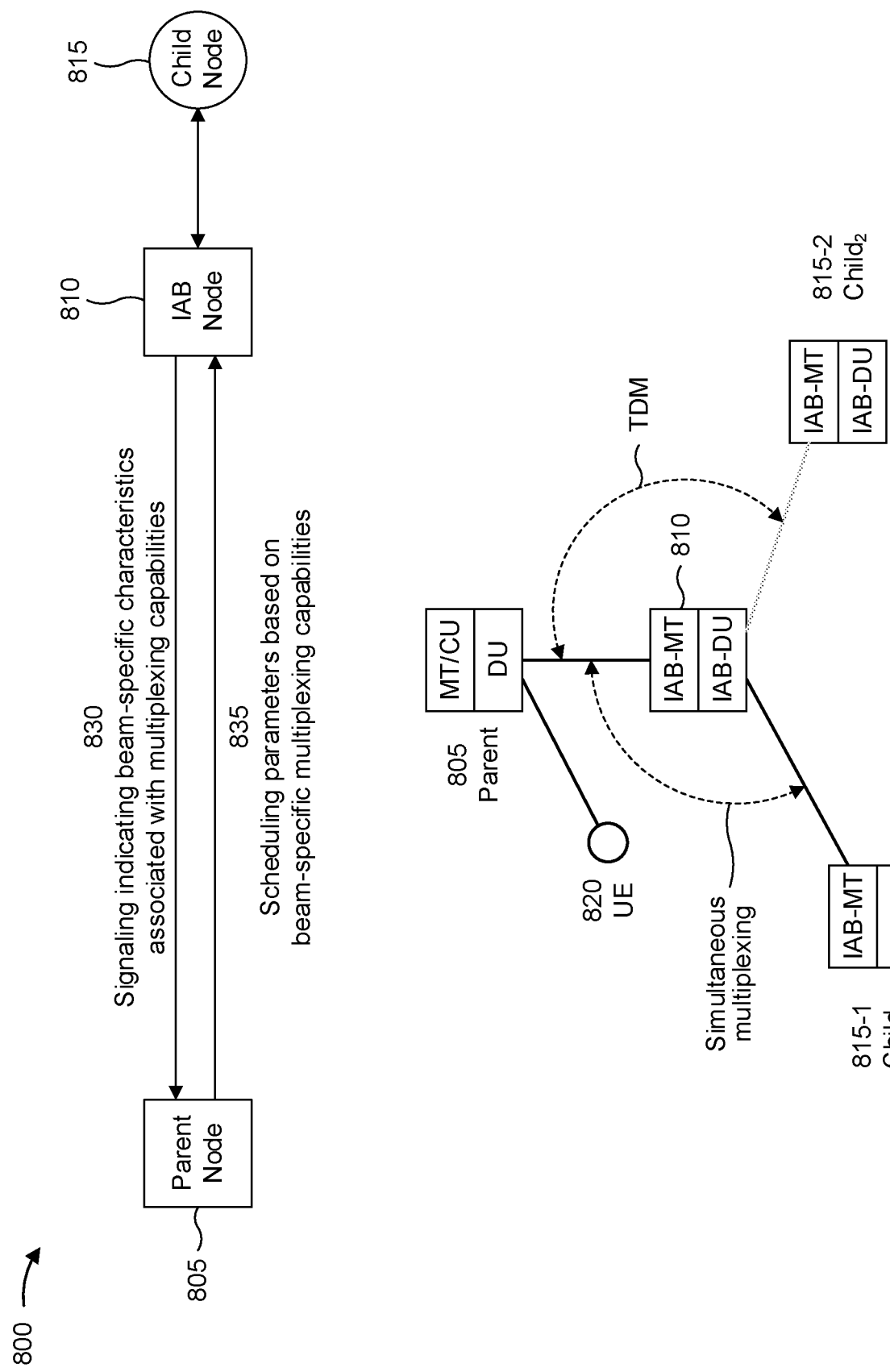

FIG. 8 is a diagram illustrating an example 800 associated with signaling enhancements for simultaneous multiplexing in an IAB network in accordance with the present disclosure. As shown in FIG. 8, example 800 includes communication between an IAB node 810, a parent node 805 of the IAB node 810 (for example, a parent IAB node or an IAB donor), one or more child nodes 815 of the IAB node 810 (for example, a first child node 815-1 and a second child node 815-2), and a UE 820 that may communicate with the parent node 805 on a wireless access link. As further shown, the IAB node 810 may include an IAB-MT that communicates with the parent node 805 via a parent link and an IAB-DU that communicates with the child node(s) 815 via one or more respective child links. In some aspects, the parent node 805 may be a parent IAB node that includes an MT and a DU, or the parent node 805 may be an IAB donor that includes a DU to schedule the IAB-MT and a CU to configure and control an entire IAB network that connects to a core network through the parent node 805. In some aspects, the parent node 805, the IAB node 810, the child node(s) 815, and the UE 820 may be included in an IAB network, such as any one or more of wireless network 100 or IAB networks 330, 365, 400 described in further detail above.

As described herein, the IAB node 810 may support communication in one or more multiplexing modes, which may include at least a (default) TDM mode, and the IAB node 810 may optionally further support one or more simultaneous multiplexing modes (for example, one or more simultaneous half-duplexing or full-duplexing modes). In some cases, however, a multiplexing capability of the IAB node 810 may be beam-specific, whereby supported multiplexing modes may vary across different IAB-MT and IAB-DU beam pairs (for example, due to different levels of spatial separation). For example, as shown in FIG. 8, the IAB node 810 may communicate with a first child node 815-1 using a first IAB-DU beam, and may communicate with a second child node 815-2 using a second IAB-DU beam, where the first and second IAB-DU beams may be associated with different beam directions. Accordingly, in the example 800 illustrated in FIG. 8, the IAB node 810 may support one or more simultaneous multiplexing modes for a beam pair that includes the IAB-MT beam used to communicate with the parent node 805 and the first IAB-DU beam used to communicate with the first child node 815-1, but the IAB node 810 may support only the default TDM mode for a beam pair that includes the IAB-MT beam used to communicate with the parent node 805 and the second IAB-DU beam used to communicate with the second child node 815-2.

Accordingly, in some aspects, the IAB node 810 may include a subset of IAB-MT and IAB-DU beam pairs that can support all multiplexing modes (including the default TDM mode and the four simultaneous multiplexing modes 630-636 or 720-726 shown in FIG. 6 and FIG. 7, respectively), another subset of IAB-MT and IAB-DU beam pairs that support only the default TDM mode, or other subsets of IAB-MT and IAB-DU beam pairs that support the default TDM mode and one or more (but not all) simultaneous multiplexing modes. However, if the IAB node 810 were to use existing signaling techniques to indicate a multiplexing capability to the parent node 805, the signaling may generally indicate any multiplexing modes that the IAB node 810 can support using at least one IAB-MT and IAB-DU beam pair. For example, in FIG. 8, the IAB node 810 would report a multiplexing capability that includes all four simultaneous multiplexing modes in addition to the default TDM mode because the IAB node 810 supports simultaneous multiplexing to communicate with the first child node 815-1, which may lead to scheduling challenges at the IAB-DU with respect to communication via the second IAB-DU beam that can only be operated in a TDM mode.

Furthermore, an additional challenge that may arise when the IAB node 810 has a beam-specific multiplexing capability is that the IAB node 810 may need to dynamically switch between different multiplexing modes (for example, from a TDM mode to a simultaneous multiplexing mode or vice versa, or from a first simultaneous multiplexing mode to a second simultaneous multiplexing mode) at a fast time scale, such as at a slot or mini-slot granularity. For example, the need to dynamically switch between different multiplexing modes may be based on scheduling decisions of the IAB-DU related to communication with one or more child nodes 815, which are generally unknown by the parent node 805, or the need to dynamically switch between different multiplexing modes may be based on scheduling of the IAB-MT by the parent node 805. Accordingly, one approach to adapt beam-specific multiplexing modes used at the IAB node 810 may be to configure the IAB-DU to make scheduling decisions for the child links (including the corresponding multiplexing mode to be used for each child link) based on advance knowledge of the scheduling status of the IAB-MT. For example, the IAB-DU may prioritize one or more child links that only support the default TDM mode to be scheduled in one or more slots in which the IAB-MT is not scheduled to transmit or receive (for example, in slots where the parent link is inactive) and to minimize scheduling in slots in which the IAB-MT is scheduled to transmit or receive (for example, in slots where the parent link is inactive). On the other hand, the IAB-DU may schedule child links that support one or more simultaneous multiplexing modes in one or more slots regardless of whether the IAB-MT is scheduled to transmit or receive. However, in cases where one or more child links support only the TDM mode and one or more child links support simultaneous multiplexing, the IAB-DU may prioritize scheduling the child links that support simultaneous multiplexing in slots in which the IAB-MT is scheduled in order to preserve sufficient resources for the child links that support only the TDM mode.

However, although the IAB-DU may be able to schedule child links based on supported multiplexing modes when the IAB-DU has advance knowledge of the scheduling status of the IAB-MT, there are various circumstances in which the IAB-DU may not know the scheduling status of the IAB-MT in advance. For example, the IAB-DU may know the scheduling status of the IAB-MT in advance in one or more slots that have a semi-static resource allocation, downlink or uplink slots that lack PDCCH occasions, downlink slots with cancelled PDCCH occasions due to a slot format indicator (SFI) or PDCCH skipping, or downlink slots with PDCCH occasions and a minimum scheduling gap greater than zero (0) (for example, where cross-slot scheduling is used). In contrast, the IAB-DU may not have advance knowledge of the scheduling status of the IAB-MT in downlink slots with PDCCH occasions and a minimum scheduling gap equal to 0 (for example, where same-slot scheduling is used). Furthermore, in cases where the IAB node 810 indicates supported multiplexing capabilities without indicating different beam-specific characteristics of the supported multiplexing capabilities, the parent node 805 may be unaware of the beam-specific multiplexing capabilities and inefficiently schedule the IAB-MT of the IAB node 710. For example, in some cases, the parent node 805 may make aggressive scheduling decisions for the IAB-MT, whereby the IAB-DU may have insufficient time resources available to schedule one or more child links (for example, child links that only support the default TDM mode). Although the IAB node 710 may have a capability to cancel one or more transmit or receive operations by the IAB MT, the cancellation of the IAB-MT operation(s) may impact system performance. For example, cancellation of a transmit or receive operation by the IAB-MT may increase a block error rate (BLER), which degrades performance on the parent link. In another example, even if the IAB node 810 were to cancel a receive operation by the IAB-MT, the parent node 805 still performs the transmission, which may interfere with communication of the IAB-DU over one or more child links and thereby increase BLER and degrade performance on the one or more child links. Furthermore, in cases where the parent node 805 makes more conservative scheduling decisions to ensure that the IAB-DU has sufficient time resources available to schedule child links, the simultaneous multiplexing capabilities of the IAB node 810 may be underutilized.

Accordingly, in a first operation 830, the IAB node 810 may transmit, to the parent node 805, signaling that indicates one or more beam-specific parameters or beam-specific characteristics associated with multiplexing capabilities supported at the IAB node 810. For example, the signaling may include a medium access control (MAC) control element (MAC-CE) or uplink control information (UCI) in cases where the parent node 805 is a parent IAB node, or the signaling may include F1-AP signaling in cases where the parent node 805 is an IAB donor or donor CU. In some aspects, the signaling that indicates the beam-specific multiplexing capabilities of the IAB node 810 may indicate one or more multiplexing modes that are supported for a given IAB-MT and IAB-DU beam pair (for example, whether the IAB-MT and IAB-DU beam pair supports only the default TDM mode or one or more simultaneous multiplexing modes in addition to the default TDM mode). Furthermore, in some aspects, the signaling may include a request to perform a fast switch between different multiplexing modes (for example, between different simultaneous multiplexing modes or between a simultaneous multiplexing mode and the default TDM mode). In such cases, the signaling may indicate a time scale associated with the switch, which may be indicated at a granularity of one or more slots, one or more frames, one or more milliseconds, or another granularity.

Additionally or alternatively, the signaling may indicate one or more constraints on resource utilization for one or more IAB-MT beams (for example, for a recommended or requested IAB-MT beam or a non-preferred or non-requested IAB-MT beam). For example, the signaling may indicate a maximum resource utilization (for example, a ratio or percentage value) for an IAB-MT beam to ensure that the IAB-DU has sufficient time resources available to schedule child links that support only the TDM mode. Additionally or alternatively, the signaling may indicate time-frequency resources that are requested to be associated with one or more IAB-MT. For example, the IAB node 810 may determine a desired time-frequency resource pattern based on a scheduling plan of the IAB-DU or a scheduling plan to switch between different multiplexing modes. Furthermore, in some aspects, the signaling transmitted from the IAB node 810 to the parent node 805 may indicate one or more IAB-DU beams that are requested (for example, preferred) to be used on one or more child links simultaneously with an associated IAB-MT beam or one or more IAB-DU beams to be restricted from being used on one or more child links simultaneously with an associated IAB-MT beam.

As further shown in FIG. 8, in a second operation 835, the parent node 805 may transmit one or more scheduling parameters for the IAB-MT to the IAB node 810 based on the signaling indicating the beam-specific characteristics associated with the multiplexing capabilities of the IAB node 810. Furthermore, in cases where the parent node 805 is a parent IAB node, the parent node 805 may forward the beam-specific characteristics associated with the multiplexing capabilities of the IAB node 810 to a parent of the parent node 805 such that the multiplexing capabilities of the IAB node 810 may be reported to an IAB donor or donor CU. The IAB donor or donor CU may then update a resource configuration on the parent node 805 and the IAB node 810 based on the beam-specific characteristics associated with the multiplexing capabilities of the IAB node 810. For example, in some aspects, the resource configuration that is updated by the IAB donor and communicated to the parent node 805 and the IAB node 810 may configure each time resource in a set of time resources as one of a hard resource, a soft resource, or a not available resource. Additionally or alternatively, the resource configuration that is updated by the IAB donor and communicated to the parent node 805 and the IAB node 810 may include a TDD configuration that configures each time resource in a set of time resources as one of a downlink-only resource, an uplink-only resource, or a flexible resource. For example, in some aspects, the IAB donor or donor CU may update the resource configuration for the parent node 805 or the IAB node 810 to have fewer overlapping hard resources across the parent node 805 and the IAB node 810 or more soft resources for the IAB node 810 in cases where there are beam-specific simultaneous multiplexing capabilities.

Figure 9:
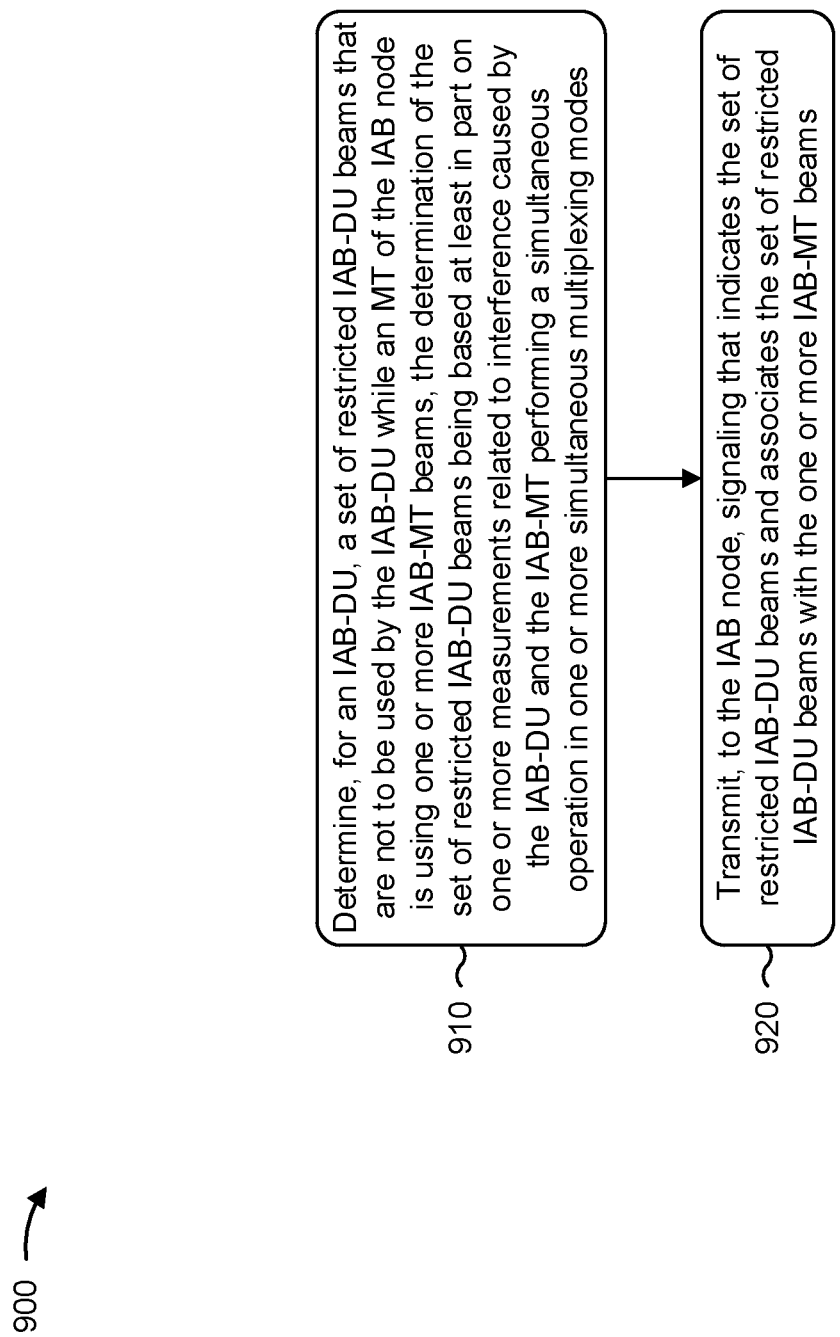
FIGS. 9-10 are flowcharts illustrating example processes performed, for example, by a parent node in an IAB network in accordance with the present disclosure.

FIG. 9 is a flowchart illustrating an example process 900 performed, for example, by a parent node in an IAB network in accordance with the present disclosure. Example process 900 is an example where the parent node (for example, parent node 605, parent node 705, or parent node 805) performs operations associated with signaling enhancements for simultaneous multiplexing in an IAB network.

As shown in FIG. 9, in some aspects, process 900 may include determining, for an IAB-DU, a set of restricted IAB-DU beams that are not to be used by the IAB-DU while an IAB-MT of the IAB node is using one or more IAB-MT beams, the determination of the set of restricted IAB-DU beams being based at least in part on one or more measurements related to interference caused by the IAB-DU and the IAB-MT performing a simultaneous operation in one or more simultaneous multiplexing modes (block 910). For example, the parent node (such as by using communication manager 140 or determination component 1308, depicted in FIG. 13) may determine, for an IAB-DU, a set of restricted IAB-DU beams that are not to be used by the IAB-DU while an IAB-MT of the IAB node is using one or more IAB-MT beams, the determination of the set of restricted IAB-DU beams being based at least in part on one or more measurements related to interference caused by the IAB-DU and the IAB-MT performing a simultaneous operation in one or more simultaneous multiplexing modes, as described above.

As further shown in FIG. 9, in some aspects, process 900 may include transmitting, to the IAB node, signaling that indicates the set of restricted IAB-DU beams and associates the set of restricted IAB-DU beams with the one or more IAB-MT beams (block 920). For example, the parent node (such as by using communication manager 140 or transmission component 1304, depicted in FIG. 13) may transmit, to the IAB node, signaling that indicates the set of restricted IAB-DU beams and associates the set of restricted IAB-DU beams with the one or more IAB-MT beams, as described above.

Process 900 may include additional aspects, such as any single aspect or any combination of aspects described below or in connection with one or more other processes described elsewhere herein.

In a first additional aspect, the signaling includes one or more fields that associate the set of restricted IAB-DU beams with the one or more IAB-MT beams.

In a second additional aspect, alone or in combination with the first aspect, the signaling indicates that each IAB-DU beam included in the set of restricted IAB-DU beams is associated with all IAB-MT beams based at least in part on the signaling omitting one or more fields to associate the set of restricted IAB-DU beams with any of the one or more IAB-MT beams.

Although FIG. 9 shows example blocks of process 900, in some aspects, process 900 may include additional blocks, fewer blocks, different blocks, or differently arranged blocks than those depicted in FIG. 9. Additionally or alternatively, two or more of the blocks of process 900 may be performed in parallel.

Figure 10:
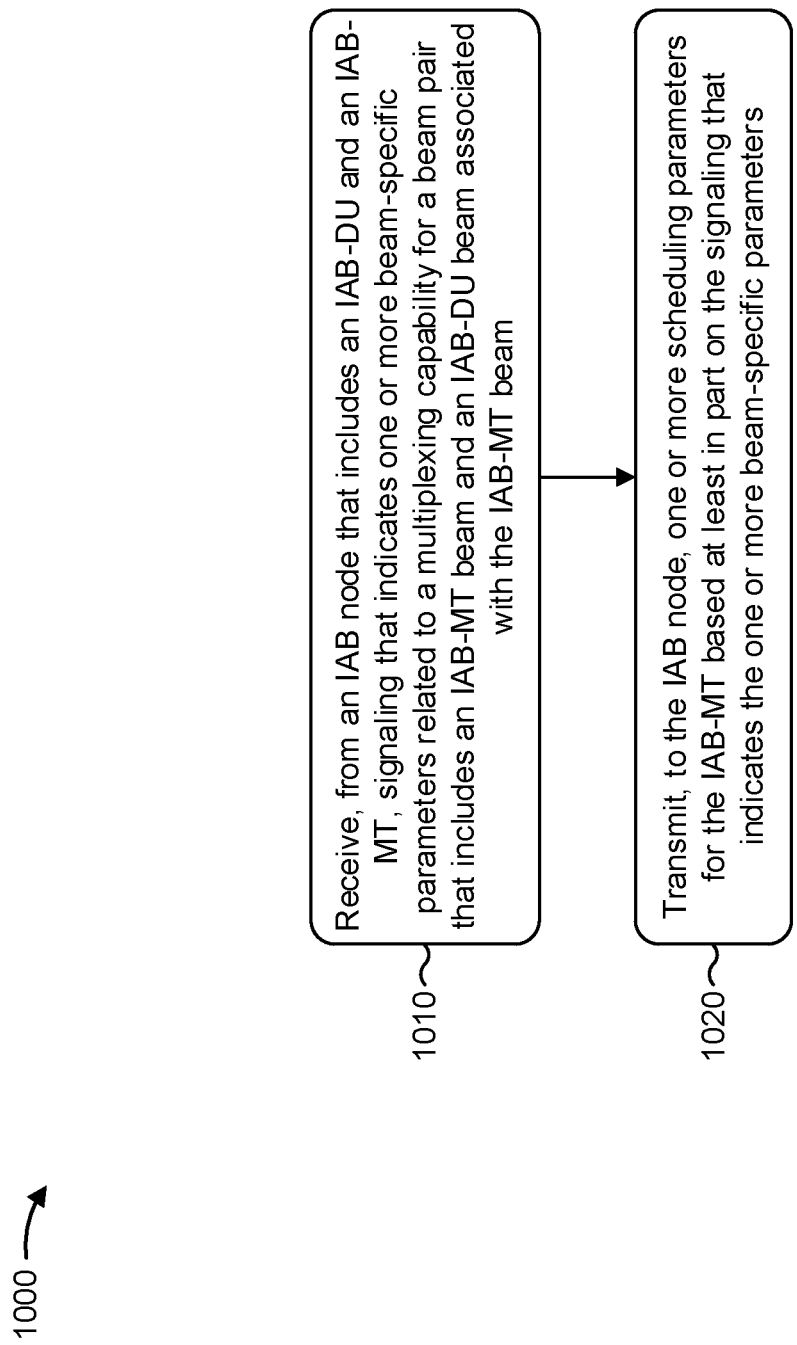

FIG. 10 is a flowchart illustrating an example process 1000 performed, for example, by a parent node in an IAB network in accordance with the present disclosure. Example process 1000 is an example where the parent node (for example, parent node 605, parent node 705, or parent node 805) performs operations associated with signaling enhancements for simultaneous multiplexing in an IAB network.

As shown in FIG. 10, in some aspects, process 1000 may include receiving, from an IAB node that includes an IAB-DU and an IAB-MT, signaling that indicates one or more beam-specific parameters related to a multiplexing capability for a beam pair that includes an IAB-MT beam and an IAB-DU beam associated with the IAB-MT beam (block 1010). For example, the parent node (such as by using communication manager 140 or reception component 1302, depicted in FIG. 13) may receive, from an IAB node that includes an IAB-DU and an IAB-MT, signaling that indicates one or more beam-specific parameters related to a multiplexing capability for a beam pair that includes an IAB-MT beam and an IAB-DU beam associated with the IAB-MT beam.

As further shown in FIG. 10, in some aspects, process 1000 may include transmitting, to the IAB node, one or more scheduling parameters for the IAB-MT based at least in part on the signaling that indicates the one or more beam-specific parameters (block 1020). For example, the parent node (such as by using communication manager 140 or transmission component 1308, depicted in FIG. 13) may transmit, to the IAB node, one or more scheduling parameters for the IAB-MT based at least in part on the signaling that indicates the one or more beam-specific parameters.

Process 1000 may include additional aspects, such as any single aspect or any combination of aspects described below or in connection with one or more other processes described elsewhere herein.

In a first additional aspect, the one or more beam-specific parameters indicate whether the beam pair supports one or more simultaneous multiplexing modes.

In a second additional aspect, alone or in combination with the first aspect, the signaling received from the IAB node includes a request to switch the beam pair from a first simultaneous multiplexing mode to a second simultaneous multiplexing mode.

In a third additional aspect, alone or in combination with one or more of the first and second aspects, the one or more beam-specific parameters include a time scale associated with the switch.

In a fourth additional aspect, alone or in combination with one or more of the first through third aspects, the one or more beam-specific parameters include one or more constraints on resource utilization over the IAB-MT beam included in the beam pair.

In a fifth additional aspect, alone or in combination with one or more of the first through fourth aspects, the one or more beam-specific parameters include a time-frequency resource pattern to associate with the IAB-MT beam included in the beam pair.

In a sixth additional aspect, alone or in combination with one or more of the first through fifth aspects, the one or more beam-specific parameters indicate one or more IAB-DU beams or IAB-DU child links that are requested to be associated with or restricted from being associated with the IAB-MT beam included in the beam pair.

In a seventh additional aspect, alone or in combination with one or more of the first through sixth aspects, the signaling that indicates the one or more beam-specific parameters includes F1-AP signaling, a MAC-CE, or UCI that indicates the one or more beam-specific parameters.

In an eighth additional aspect, alone or in combination with one or more of the first through seventh aspects, the one or more scheduling parameters configure, at one or more of the parent node or the IAB node, each respective time resource of a plurality of time resources as one of a hard resource, a soft resource, or a not available resource.

In a ninth additional aspect, alone or in combination with one or more of the first through eighth aspects, the one or more scheduling parameters configure, at one or more of the parent node or the IAB node, each respective time resource of a plurality of time resources as one of a downlink-only resource, an uplink-only resource, or a flexible resource.

Although FIG. 10 shows example blocks of process 1000, in some aspects, process 1000 may include additional blocks, fewer blocks, different blocks, or differently arranged blocks than those depicted in FIG. 10. Additionally or alternatively, two or more of the blocks of process 1000 may be performed in parallel.

Figure 11:
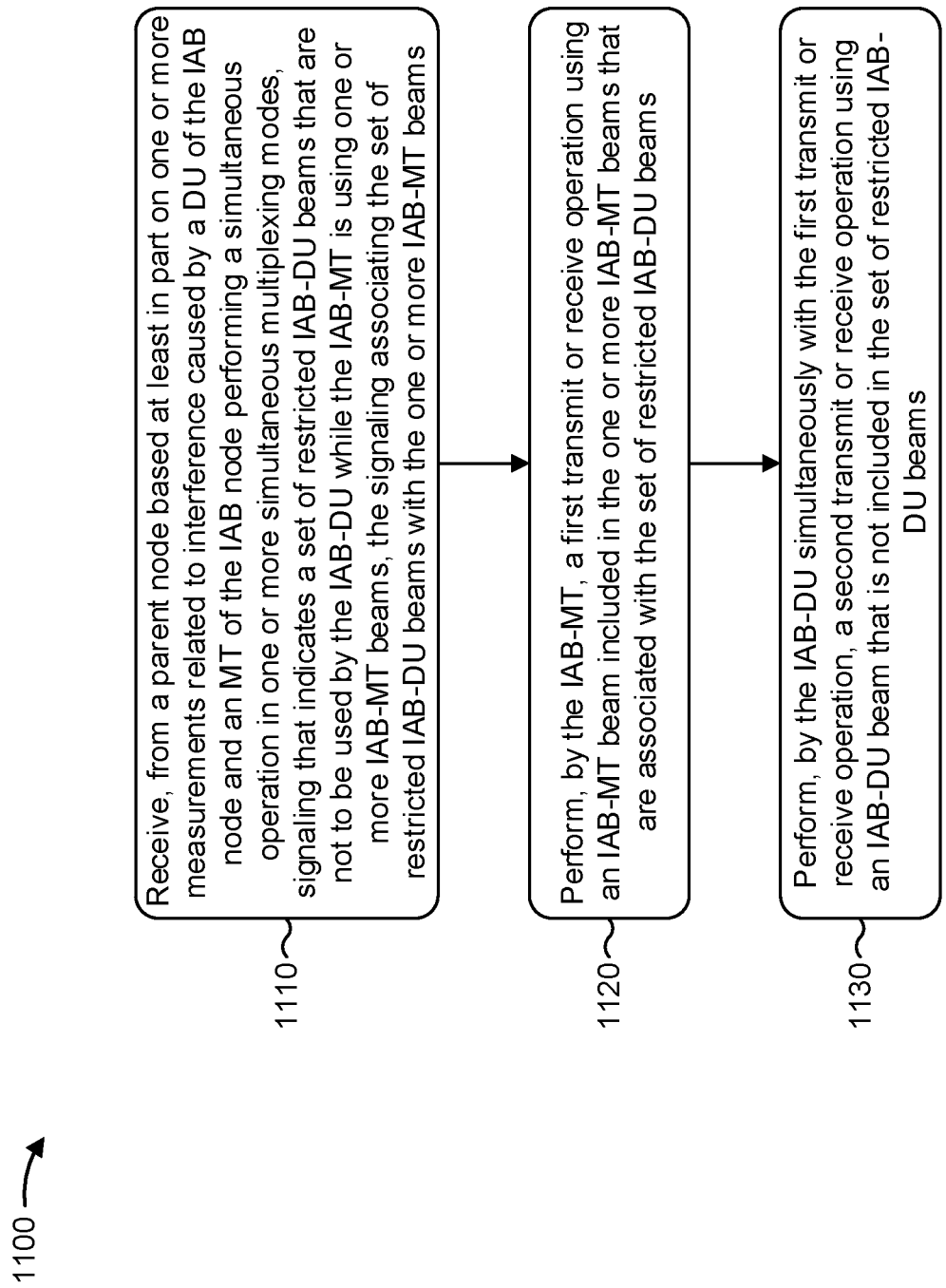
FIGS. 11-12 are flowcharts illustrating example processes performed, for example, by an IAB node in accordance with the present disclosure.

FIG. 11 is a flowchart illustrating an example process 1100 performed, for example, by an IAB node that includes an IAB-MT and an IAB-DU in accordance with the present disclosure. Example process 1100 is an example where the IAB node (for example, IAB node 610, IAB node 710, or IAB node 810) performs operations associated with signaling enhancements for simultaneous multiplexing in an IAB network.

As shown in FIG. 11, in some aspects, process 1100 may include receiving, from a parent node based at least in part on one or more measurements related to interference caused by the IAB-DU and the IAB-MT performing a simultaneous operation in one or more simultaneous multiplexing modes, signaling that indicates a set of restricted IAB-DU beams that are not to be used by the IAB-DU while the IAB-MT is using one or more IAB-MT beams, the signaling associating the set of restricted IAB-DU beams with the one or more IAB-MT beams (block 1110). For example, the IAB node (such as by using communication manager 150 or reception component 1402, depicted in FIG. 1402) may receive, from a parent node based at least in part on one or more measurements related to interference caused by the IAB-DU and the IAB-MT performing a simultaneous operation in one or more simultaneous multiplexing modes, signaling that indicates a set of restricted IAB-DU beams that are not to be used by the IAB-DU while the IAB-MT is using one or more IAB-MT beams, the signaling associating the set of restricted IAB-DU beams with the one or more IAB-MT beams, as described above.

As further shown in FIG. 11, in some aspects, process 1100 may include performing a first transmit or receive operation using an IAB-MT beam included in the one or more IAB-MT beams that are associated with the set of restricted IAB-DU beams (block 1120). For example, the IAB node (such as by using communication manager 150 or performance component 1408, depicted in FIG. 14) may perform a first transmit or receive operation using an IAB-MT beam included in the one or more IAB-MT beams that are associated with the set of restricted IAB-DU beams, as described above.

As further shown in FIG. 11, in some aspects, process 1100 may include performing a second transmit or receive operation using an IAB-DU beam that is not included in the set of restricted IAB-DU beams (block 1130). For example, the IAB node (such as by using communication manager 150 or performance component 1408, depicted in FIG. 14) may perform a second transmit or receive operation using an IAB-DU beam that is not included in the set of restricted IAB-DU beams, as described above.

Process 1100 may include additional aspects, such as any single aspect or any combination of aspects described below or in connection with one or more other processes described elsewhere herein.

In a first additional aspect, the signaling includes one or more fields that associate the set of restricted IAB-DU beams with the one or more IAB-MT beams.

In a second additional aspect, alone or in combination with the first aspect, the signaling indicates that each IAB-DU beam included in the set of restricted IAB-DU beams is associated with all IAB-MT beams based at least in part on the signaling omitting one or more fields to associate the set of restricted IAB-DU beams with any of the one or more IAB-MT beams.

Although FIG. 11 shows example blocks of process 1100, in some aspects, process 1100 may include additional blocks, fewer blocks, different blocks, or differently arranged blocks than those depicted in FIG. 11. Additionally or alternatively, two or more of the blocks of process 1100 may be performed in parallel.

Figure 12:
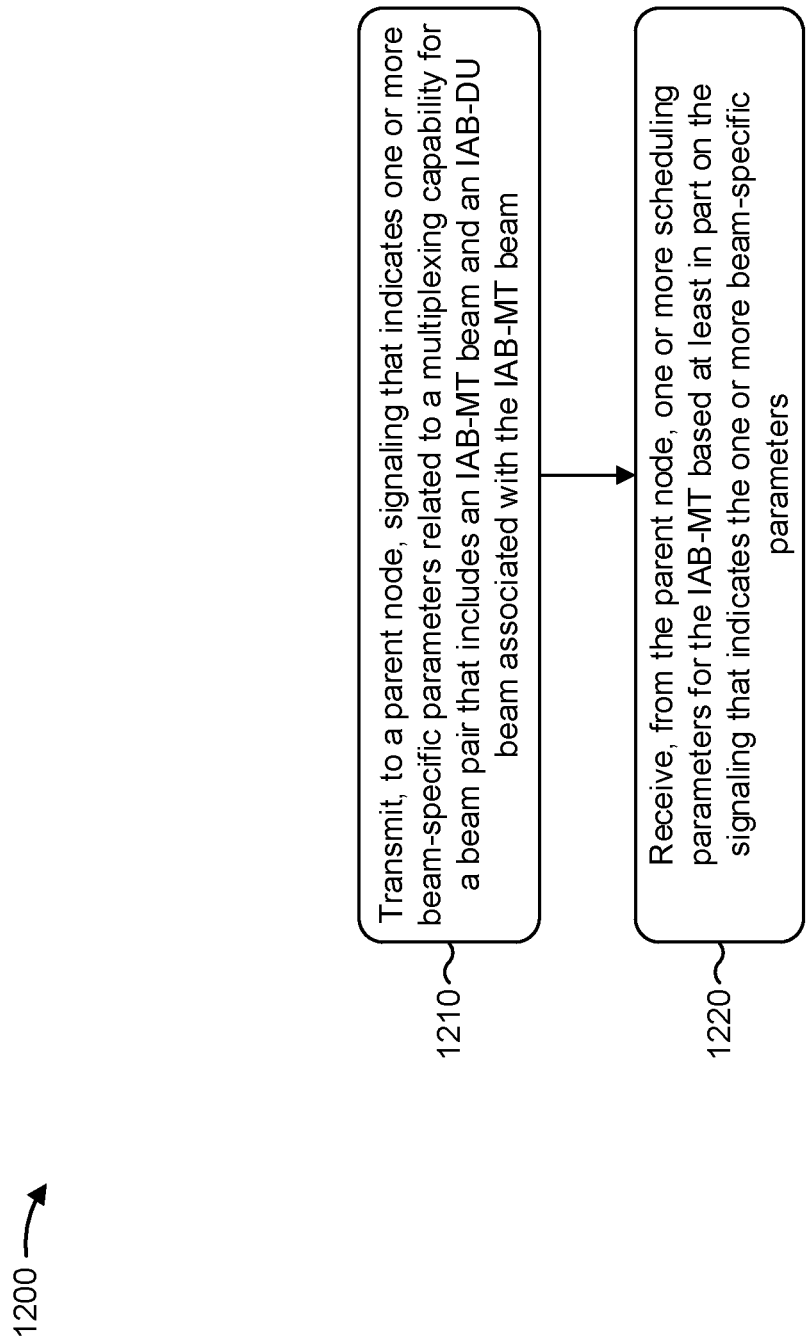

FIG. 12 is a flowchart illustrating an example process 1200 performed, for example, by an IAB node that includes an IAB-MT and an IAB-DU in accordance with the present disclosure. Example process 1200 is an example where the IAB node (for example, IAB node 610, IAB node 710, or IAB node 810) performs operations associated with signaling enhancements for simultaneous multiplexing in an IAB network.

As shown in FIG. 12, in some aspects, process 1200 may include transmitting, to a parent node, signaling that indicates one or more beam-specific parameters related to a multiplexing capability for a beam pair that includes an IAB-MT beam and an IAB-DU beam associated with the IAB-MT beam (block 1210). For example, the IAB node (such as by using communication manager 150 or transmission component 1404, depicted in FIG. 14) may transmit, to a parent node, signaling that indicates one or more beam-specific parameters related to a multiplexing capability for a beam pair that includes an IAB-MT beam and an IAB-DU beam associated with the IAB-MT beam.

As further shown in FIG. 12, in some aspects, process 1200 may include receiving, from the parent node, one or more scheduling parameters for the IAB-MT based at least in part on the signaling that indicates the one or more beam-specific parameters (block 1220). For example, the IAB node (such as by using communication manager 150 or reception component 1402, depicted in FIG. 14) may receive, from the parent node, one or more scheduling parameters for the IAB-MT based at least in part on the signaling that indicates the one or more beam-specific parameters.

Process 1200 may include additional aspects, such as any single aspect or any combination of aspects described below or in connection with one or more other processes described elsewhere herein.

In a first additional aspect, the one or more beam-specific parameters indicate whether the beam pair supports one or more simultaneous multiplexing modes.

In a second additional aspect, alone or in combination with the first aspect, the signaling transmitted to the parent node includes a request to switch the beam pair from a first simultaneous multiplexing mode to a second simultaneous multiplexing mode.

In a third additional aspect, alone or in combination with one or more of the first and second aspects, the one or more beam-specific parameters include a time scale associated with the switch.

In a fourth additional aspect, alone or in combination with one or more of the first through third aspects, the one or more beam-specific parameters include one or more constraints on resource utilization over the IAB-MT beam included in the beam pair.

In a fifth additional aspect, alone or in combination with one or more of the first through fourth aspects, the one or more beam-specific parameters include a time-frequency resource pattern to associate with the IAB-MT beam included in the beam pair.

In a sixth additional aspect, alone or in combination with one or more of the first through fifth aspects, the one or more beam-specific parameters indicate one or more IAB-DU beams or IAB-DU child links that are requested to be associated with or restricted from being associated with the IAB-MT beam included in the beam pair.

In a seventh additional aspect, alone or in combination with one or more of the first through sixth aspects, the signaling that indicates the one or more beam-specific parameters includes F1-AP signaling, a MAC-CE, or UCI that indicates the one or more beam-specific parameters.

In an eighth additional aspect, alone or in combination with one or more of the first through seventh aspects, the one or more scheduling parameters configure each respective time resource of a plurality of time resources at the IAB node as one of a hard resource, a soft resource, or a not available resource.

In a ninth additional aspect, alone or in combination with one or more of the first through eighth aspects, the one or more scheduling parameters configure each respective time resource of a plurality of time resources at the IAB node as one of a downlink-only resource, an uplink-only resource, or a flexible resource.

Although FIG. 12 shows example blocks of process 1200, in some aspects, process 1200 may include additional blocks, fewer blocks, different blocks, or differently arranged blocks than those depicted in FIG. 12. Additionally or alternatively, two or more of the blocks of process 1200 may be performed in parallel.

Figure 13:
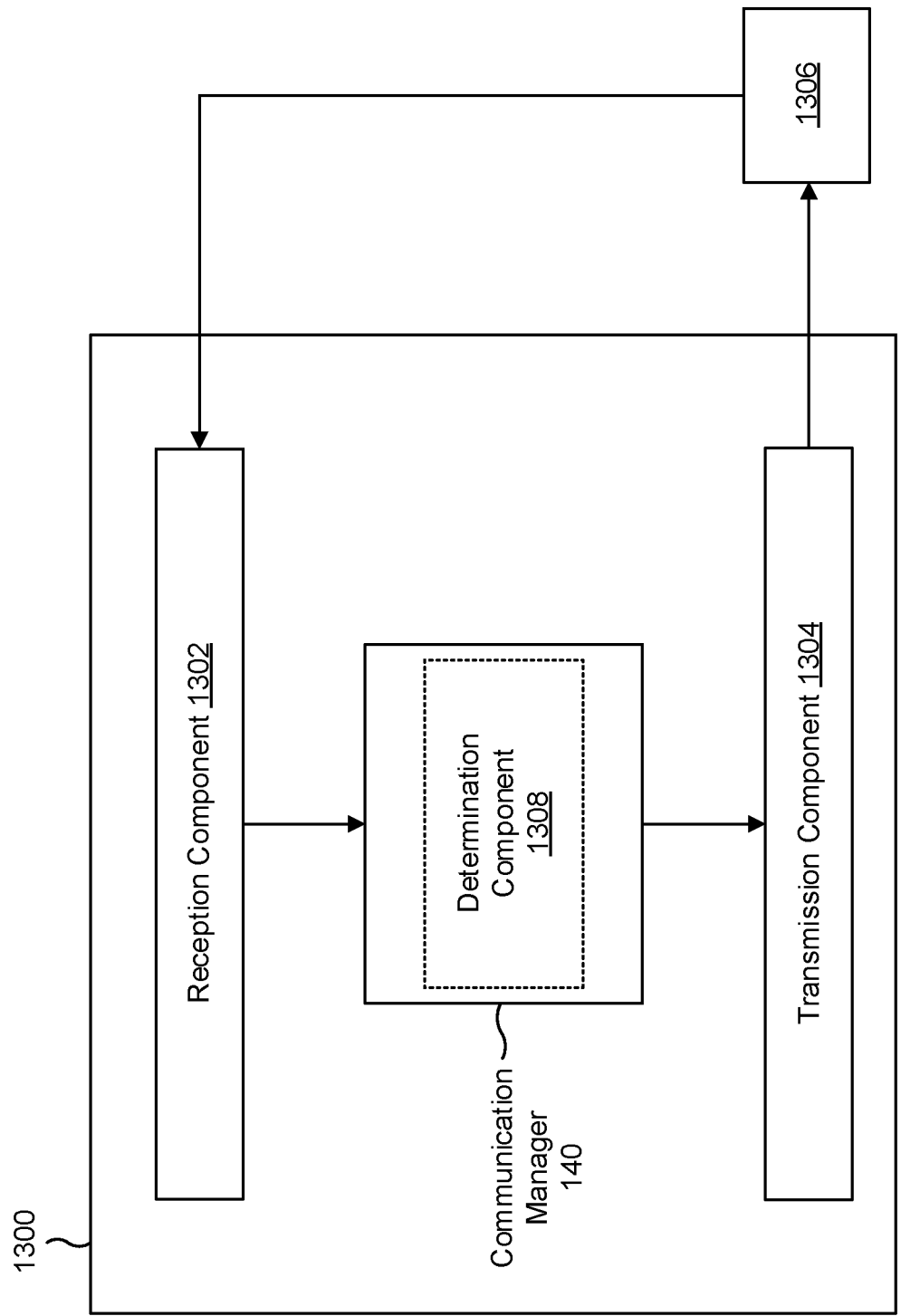
FIGS. 13-14 are diagrams of example apparatuses for wireless communication in accordance with the present disclosure.

FIG. 13 is a diagram of an example apparatus 1300 for wireless communication in accordance with the present disclosure. The apparatus 1300 may be a parent node, or a parent node may include the apparatus 1300. In some aspects, the apparatus 1300 includes a reception component 1302, a transmission component 1304, and a communication manager 140, which may be in communication with one another (for example, via one or more buses). As shown, the apparatus 1300 may communicate with another apparatus 1306 (such as a UE, a base station, or another wireless communication device) using the reception component 1302 and the transmission component 1304.

In some aspects, the apparatus 1300 may be configured to perform one or more operations described herein in connection with FIGS. 7-8. Additionally or alternatively, the apparatus 1300 may be configured to perform one or more processes described herein, such as process 900 of FIG. 9, process 1000 of FIG. 10, or a combination thereof. In some aspects, the apparatus 1300 may include one or more components of the base station described above in connection with FIG. 2, the IAB donor 405 described above in connection with FIG. 4, or the IAB node 410 described above in connection with FIG. 4.

The reception component 1302 may receive communications, such as reference signals, control information, data communications, or a combination thereof, from the apparatus 1306. The reception component 1302 may provide received communications to one or more other components of the apparatus 1300, such as the communication manager 140. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1302 may include one or more antennas, a modem, a demodulator, a MIMO detector, a receive processor, a controller/processor, a memory, or a combination thereof, of the base station described above in connection with FIG. 2.

The transmission component 1304 may transmit communications, such as reference signals, control information, data communications, or a combination thereof, to the apparatus 1306. In some aspects, the communication manager 140 may generate communications and may transmit the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the base station described above in connection with FIG. 2. In some aspects, the transmission component 1304 may be co-located with the reception component 1302 in a transceiver.

The communication manager 140 may determine, for an IAB-DU, a set of restricted IAB-DU beams that are not to be used by the IAB-DU while an IAB-MT is using one or more IAB-MT beams, the determination of the set of restricted IAB-DU beams being based at least in part on one or more measurements related to interference caused by the IAB-DU and the IAB-MT performing a simultaneous operation in one or more simultaneous multiplexing modes. The communication manager 140 may transmit or may cause the transmission component 1304 to transmit, to the IAB node, signaling that indicates the set of restricted IAB-DU beams and associates the set of restricted IAB-DU beams with the one or more IAB-MT beams. Additionally or alternatively, the communication manager 140 may receive or may cause the reception component 1302 to receive, from an IAB node that includes an IAB-DU and an IAB-MT, signaling that indicates one or more beam-specific parameters related to a multiplexing capability for a beam pair that includes an IAB-MT beam and an IAB-DU beam associated with the IAB-MT beam. The communication manager 140 may transmit or may cause the transmission component 1304 to transmit, to the IAB node, one or more scheduling parameters for the IAB-MT based at least in part on the signaling that indicates the one or more beam-specific parameters. In some aspects, the communication manager 140 may perform one or more operations described elsewhere herein as being performed by one or more components of the communication manager 140.

The communication manager 140 may include a controller/processor, a memory, a scheduler, a communication unit, or a combination thereof, of the base station described above in connection with FIG. 2. In some aspects, the communication manager 140 includes a set of components, such as a determination component 1308, among other examples. Alternatively, the set of components may be separate and distinct from the communication manager 140. In some aspects, one or more components of the set of components may include or may be implemented within a controller/processor, a memory, a scheduler, a communication unit, or a combination thereof, of the base station described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The determination component 1308 may determine, for an IAB-DU, a set of restricted IAB-DU beams that are not to be used by the IAB-DU while an IAB-MT is using one or more IAB-MT beams, the determination of the set of restricted IAB-DU beams being based at least in part on one or more measurements related to interference caused by the IAB-DU and the IAB-MT performing a simultaneous operation in one or more simultaneous multiplexing modes. The transmission component 1304 may transmit, to the IAB node, signaling that indicates the set of restricted IAB-DU beams and associates the set of restricted IAB-DU beams with the one or more IAB-MT beams.

The reception component 1302 may receive, from an IAB node that includes an IAB-DU and an IAB-MT, signaling that indicates one or more beam-specific parameters related to a multiplexing capability for a beam pair that includes an IAB-MT beam and an IAB-DU beam associated with the IAB-MT beam. The transmission component 1304 may transmit, to the IAB node, one or more scheduling parameters for the IAB-MT based at least in part on the signaling that indicates the one or more beam-specific parameters.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally or alternatively, a set of (one or more) components shown in FIG. 13 may perform one or more functions described as being performed by another set of components shown in FIG. 13.

Figure 14:
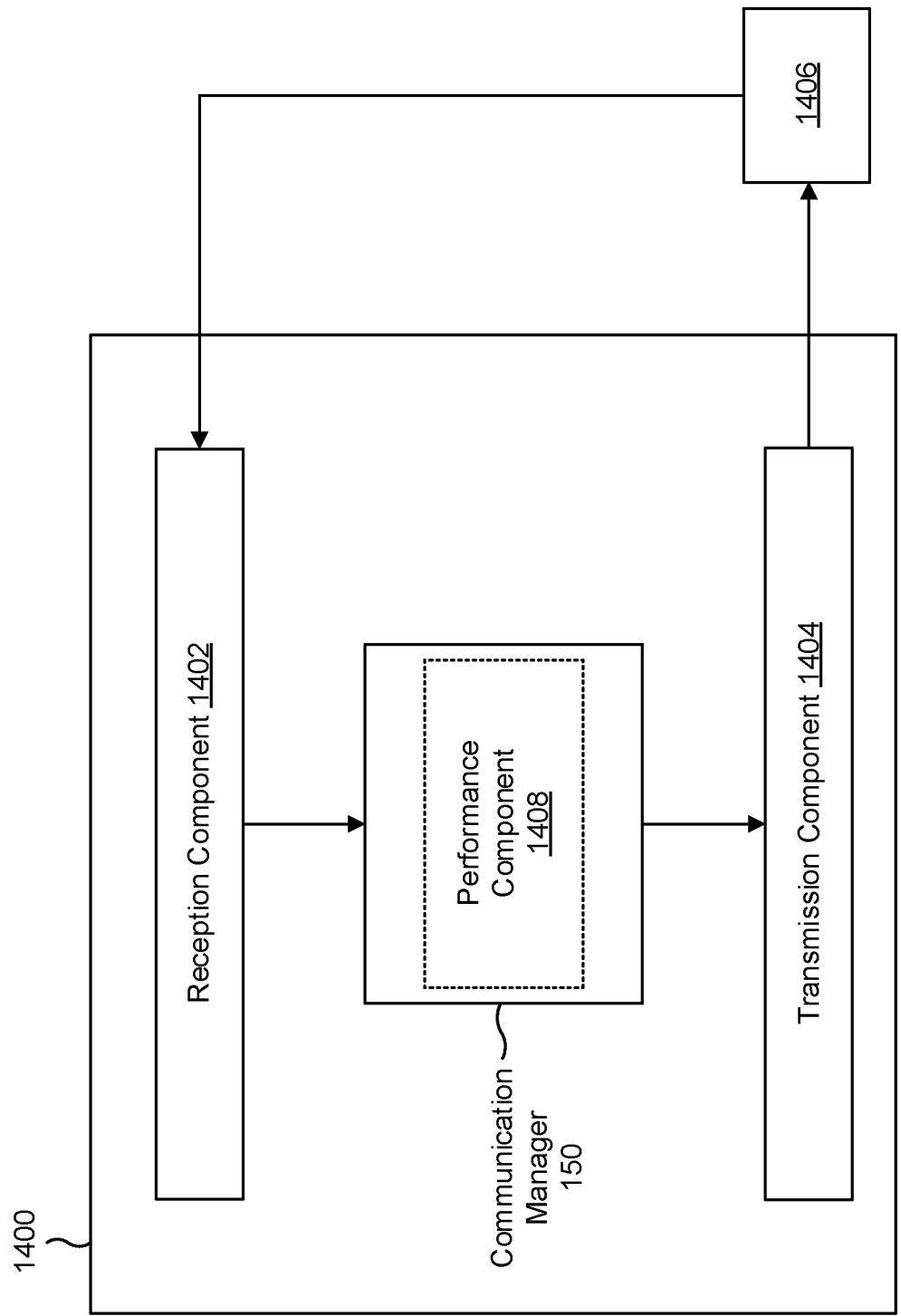

FIG. 14 is a diagram of an example apparatus 1400 for wireless communication in accordance with the present disclosure. The apparatus 1400 may be a IAB node, or a IAB node may include the apparatus 1400. In some aspects, the apparatus 1400 includes a reception component 1402, a transmission component 1404, and a communication manager 150, which may be in communication with one another (for example, via one or more buses). As shown, the apparatus 1400 may communicate with another apparatus 1406 (such as a UE, a base station, or another wireless communication device) using the reception component 1402 and the transmission component 1404.

In some aspects, the apparatus 1400 may be configured to perform one or more operations described herein in connection with FIGS. 7-8. Additionally or alternatively, the apparatus 1400 may be configured to perform one or more processes described herein, such as process 1100 of FIG. 11, process 1200 of FIG. 12, or a combination thereof. In some aspects, the apparatus 1400 may include one or more components of the base station described above in connection with FIG. 2 or the IAB node 410 described above in connection with FIG. 4.

The reception component 1402 may receive communications, such as reference signals, control information, data communications, or a combination thereof, from the apparatus 1406. The reception component 1402 may provide received communications to one or more other components of the apparatus 1400, such as the communication manager 150. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1402 may include one or more antennas, a modem, a demodulator, a MIMO detector, a receive processor, a controller/processor, a memory, or a combination thereof, of the base station described above in connection with FIG. 2.

The transmission component 1404 may transmit communications, such as reference signals, control information, data communications, or a combination thereof, to the apparatus 1406. In some aspects, the communication manager 150 may generate communications and may transmit the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the base station described above in connection with FIG. 2. In some aspects, the transmission component 1404 may be co-located with the reception component 1402 in a transceiver.

The communication manager 150 may receive or may cause the reception component 1402 to receive, from a parent node based at least in part on one or more measurements related to interference caused by the IAB-DU and the IAB-MT performing a simultaneous operation in one or more simultaneous multiplexing modes, signaling that indicates a set of restricted IAB-DU beams that are not to be used by the IAB-DU while the IAB-MT is using one or more IAB-MT beams, the signaling associating the set of restricted IAB-DU beams with the one or more IAB-MT beams. The communication manager 150 may perform or may cause the reception component 1402 or the transmission component 1404 to perform a first transmit or receive operation using an IAB-MT beam included in the one or more IAB-MT beams that are associated with the set of restricted IAB-DU beams. The communication manager 150 may perform or may cause the reception component 1402 or the transmission component 1404 to perform a second transmit or receive operation using an IAB-DU beam that is not included in the set of restricted IAB-DU beams. Additionally or alternatively, the communication manager 150 may transmit or may cause the transmission component 1404 to transmit, to a parent node, signaling that indicates one or more beam-specific parameters related to a multiplexing capability for a beam pair that includes an IAB-MT beam and an IAB-DU beam associated with the IAB-MT beam. The communication manager 150 may receive or may cause the reception component 1402 to receive, from the parent node, one or more scheduling parameters for the IAB-MT based at least in part on the signaling that indicates the one or more beam-specific parameters. In some aspects, the communication manager 150 may perform one or more operations described elsewhere herein as being performed by one or more components of the communication manager 150.

The communication manager 150 may include a controller/processor, a memory, a scheduler, a communication unit, or a combination thereof, of the base station described above in connection with FIG. 2. In some aspects, the communication manager 150 includes a set of components, such as a performance component 1408, among other examples. Alternatively, the set of components may be separate and distinct from the communication manager 150. In some aspects, one or more components of the set of components may include or may be implemented within a controller/processor, a memory, a scheduler, a communication unit, or a combination thereof, of the base station described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive, from a parent node based at least in part on one or more measurements related to interference caused by the IAB-DU and the IAB-MT performing a simultaneous operation in one or more simultaneous multiplexing modes, signaling that indicates a set of restricted IAB-DU beams that are not to be used by the IAB-DU while the IAB-MT is using one or more IAB-MT beams, the signaling associating the set of restricted IAB-DU beams with the one or more IAB-MT beams. The performance component 1408 may perform a first transmit or receive operation using an IAB-MT beam included in the one or more IAB-MT beams that are associated with the set of restricted IAB-DU beams. The performance component 1408 may perform a second transmit or receive operation using an IAB-DU beam that is not included in the set of restricted IAB-DU beams.

The transmission component 1404 may transmit, to a parent node, signaling that indicates one or more beam-specific parameters related to a multiplexing capability for a beam pair that includes an IAB-MT beam and an IAB-DU beam associated with the IAB-MT beam. The reception component 1402 may receive, from the parent node, one or more scheduling parameters for the IAB-MT based at least in part on the signaling that indicates the one or more beam-specific parameters.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by a parent node, comprising: determining, for a distributed unit (DU) of an integrated access and backhaul (IAB) node (IAB-DU), a set of restricted IAB-DU beams that are not to be used by the IAB-DU while a mobile termination function (MT) of the IAB node (IAB-MT) is using one or more IAB-MT beams, the determination of the set of restricted IAB-DU beams being based at least in part on one or more measurements related to interference caused by the IAB-DU and the IAB-MT performing a simultaneous operation in one or more simultaneous multiplexing modes; and transmitting, to the IAB node, signaling that indicates the set of restricted IAB-DU beams and associates the set of restricted IAB-DU beams with the one or more IAB-MT beams.

Aspect 2: The method of Aspect 1, wherein the signaling includes one or more fields that associate the set of restricted IAB-DU beams with the one or more IAB-MT beams.

Aspect 3: The method of Aspect 1, wherein the signaling indicates that each IAB-DU beam included in the set of restricted IAB-DU beams is associated with all IAB-MT beams based at least in part on the signaling omitting one or more fields to associate the set of restricted IAB-DU beams with any of the one or more IAB-MT beams.

Aspect 4: A method of wireless communication performed by a parent node, comprising: receiving, from an IAB node that includes an IAB-DU and an IAB-MT, signaling that indicates one or more beam-specific parameters related to a multiplexing capability for a beam pair that includes an IAB-MT beam and an IAB-DU beam associated with the IAB-MT beam; and transmitting, to the IAB node, one or more scheduling parameters for the IAB-MT based at least in part on the signaling that indicates the one or more beam-specific parameters.

Aspect 5: The method of Aspect 4, wherein the one or more beam-specific parameters indicate whether the beam pair supports one or more simultaneous multiplexing modes.

Aspect 6: The method of any of Aspects 4-5, wherein the signaling received from the IAB node includes a request to switch the beam pair from a first simultaneous multiplexing mode to a second simultaneous multiplexing mode.

Aspect 7: The method of Aspect 6, wherein the one or more beam-specific parameters include a time scale associated with the switch.

Aspect 8: The method of any of Aspects 4-7, wherein the one or more beam-specific parameters include one or more constraints on resource utilization over the IAB-MT beam included in the beam pair.

Aspect 9: The method of any of Aspects 4-8, wherein the one or more beam-specific parameters include a time-frequency resource pattern to associate with the IAB-MT beam included in the beam pair.

Aspect 10: The method of any of Aspects 4-9, wherein the one or more beam-specific parameters indicate one or more IAB-DU beams or IAB-DU child links that are requested to be associated with or restricted from being associated with the IAB-MT beam included in the beam pair.

Aspect 11: The method of any of Aspects 4-10, wherein the signaling that indicates the one or more beam-specific parameters includes F1-AP signaling, a MAC-CE, or UCI that indicates the one or more beam-specific parameters.

Aspect 12: The method of any of Aspects 4-11, wherein the one or more scheduling parameters configure, at one or more of the parent node or the IAB node, each respective time resource of a plurality of time resources as one of a hard resource, a soft resource, or a not available resource.

Aspect 13: The method of any of Aspects 4-12, wherein the one or more scheduling parameters configure, at one or more of the parent node or the IAB node, each respective time resource of a plurality of time resources as one of a downlink-only resource, an uplink-only resource, or a flexible resource.

Aspect 14: A method of wireless communication performed by an integrated access and backhaul (IAB) node that includes a distributed unit (IAB-DU) and a mobile termination function (IAB-MT), comprising: receiving, from a parent node based at least in part on one or more measurements related to interference caused by the IAB-DU and the IAB-MT performing a simultaneous operation in one or more simultaneous multiplexing modes, signaling that indicates a set of restricted IAB-DU beams that are not to be used by the IAB-DU while the IAB-MT is using one or more IAB-MT beams, the signaling associating the set of restricted IAB-DU beams with the one or more IAB-MT beams; performing, by the IAB-MT, a first transmit or receive operation using an IAB-MT beam included in the one or more IAB-MT beams that are associated with the set of restricted IAB-DU beams; and performing, by the IAB-DU simultaneously with the first transmit or receive operation, a second transmit or receive operation using an IAB-DU beam that is not included in the set of restricted IAB-DU beams.

Aspect 15: The method of Aspect 14, wherein the signaling includes one or more fields that associate the set of restricted IAB-DU beams with the one or more IAB-MT beams.

Aspect 16: The method of Aspect 14, wherein the signaling indicates that each IAB-DU beam included in the set of restricted IAB-DU beams is associated with all IAB-MT beams based at least in part on the signaling omitting one or more fields to associate the set of restricted IAB-DU beams with any of the one or more IAB-MT beams.

Aspect 17: A method of wireless communication performed by an integrated access and backhaul (IAB) node that includes a distributed unit (IAB-DU) and a mobile termination function (IAB-MT), comprising: transmitting, to a parent node, signaling that indicates one or more beam-specific parameters related to a multiplexing capability for a beam pair that includes an IAB-MT beam and an IAB-DU beam associated with the IAB-MT beam; and receiving, from the parent node, one or more scheduling parameters for the IAB-MT based at least in part on the signaling that indicates the one or more beam-specific parameters.

Aspect 18: The method of Aspect 17, wherein the one or more beam-specific parameters indicate whether the beam pair supports one or more simultaneous multiplexing modes.

Aspect 19: The method of any of Aspects 17-18, wherein the signaling transmitted to the parent node includes a request to switch the beam pair from a first simultaneous multiplexing mode to a second simultaneous multiplexing mode.

Aspect 20: The method of Aspect 19, wherein the one or more beam-specific parameters include a time scale associated with the switch.

Aspect 21: The method of any of Aspects 17-20, wherein the one or more beam-specific parameters include one or more constraints on resource utilization over the IAB-MT beam included in the beam pair.

Aspect 22: The method of any of Aspects 17-21, wherein the one or more beam-specific parameters include a time-frequency resource pattern to associate with the IAB-MT beam included in the beam pair.

Aspect 23: The method of any of Aspects 17-22, wherein the one or more beam-specific parameters indicate one or more IAB-DU beams or IAB-DU child links that are requested to be associated with or restricted from being associated with the IAB-MT beam included in the beam pair.

Aspect 24: The method of any of Aspects 17-23, wherein the signaling that indicates the one or more beam-specific parameters includes F1-AP signaling, a MAC-CE, or UCI that indicates the one or more beam-specific parameters.

Aspect 25: The method of any of Aspects 17-24, wherein the one or more scheduling parameters configure each respective time resource of a plurality of time resources at the IAB node as one of a hard resource, a soft resource, or a not available resource.

Aspect 26: The method of any of Aspects 17-25, wherein the one or more scheduling parameters configure each respective time resource of a plurality of time resources at the IAB node as one of a downlink-only resource, an uplink-only resource, or a flexible resource.

Aspect 27: An apparatus for wireless communication at a device, comprising a processor; memory coupled with the processor; and instructions stored in the memory and executable by the processor to cause the apparatus to perform the method of one or more of Aspects 1-3.

Aspect 28: A device for wireless communication, comprising a memory and one or more processors coupled to the memory, the one or more processors configured to perform the method of one or more of Aspects 1-3.

Aspect 29: An apparatus for wireless communication, comprising at least one means for performing the method of one or more of Aspects 1-3.

Aspect 30: A non-transitory computer-readable medium storing code for wireless communication, the code comprising instructions executable by a processor to perform the method of one or more of Aspects 1-3.

Aspect 31: A non-transitory computer-readable medium storing a set of instructions for wireless communication, the set of instructions comprising one or more instructions that, when executed by one or more processors of a device, cause the device to perform the method of one or more of Aspects 1-3.

Aspect 32: An apparatus for wireless communication at a device, comprising a processor; memory coupled with the processor; and instructions stored in the memory and executable by the processor to cause the apparatus to perform the method of one or more of Aspects 4-13.

Aspect 33: A device for wireless communication, comprising a memory and one or more processors coupled to the memory, the one or more processors configured to perform the method of one or more of Aspects 4-13.

Aspect 34: An apparatus for wireless communication, comprising at least one means for performing the method of one or more of Aspects 4-13.

Aspect 35: A non-transitory computer-readable medium storing code for wireless communication, the code comprising instructions executable by a processor to perform the method of one or more of Aspects 4-13.

Aspect 36: A non-transitory computer-readable medium storing a set of instructions for wireless communication, the set of instructions comprising one or more instructions that, when executed by one or more processors of a device, cause the device to perform the method of one or more of Aspects 4-13.

Aspect 37: An apparatus for wireless communication at a device, comprising a processor; memory coupled with the processor; and instructions stored in the memory and executable by the processor to cause the apparatus to perform the method of one or more of Aspects 14-16.

Aspect 38: A device for wireless communication, comprising a memory and one or more processors coupled to the memory, the one or more processors configured to perform the method of one or more of Aspects 14-16.

Aspect 39: An apparatus for wireless communication, comprising at least one means for performing the method of one or more of Aspects 14-16.

Aspect 40: A non-transitory computer-readable medium storing code for wireless communication, the code comprising instructions executable by a processor to perform the method of one or more of Aspects 14-16.

Aspect 41: A non-transitory computer-readable medium storing a set of instructions for wireless communication, the set of instructions comprising one or more instructions that, when executed by one or more processors of a device, cause the device to perform the method of one or more of Aspects 14-16.

Aspect 42: An apparatus for wireless communication at a device, comprising a processor; memory coupled with the processor; and instructions stored in the memory and executable by the processor to cause the apparatus to perform the method of one or more of Aspects 17-26.

Aspect 43: A device for wireless communication, comprising a memory and one or more processors coupled to the memory, the one or more processors configured to perform the method of one or more of Aspects 17-26.

Aspect 44: An apparatus for wireless communication, comprising at least one means for performing the method of one or more of Aspects 17-26.

Aspect 45: A non-transitory computer-readable medium storing code for wireless communication, the code comprising instructions executable by a processor to perform the method of one or more of Aspects 17-26.

Aspect 46: A non-transitory computer-readable medium storing a set of instructions for wireless communication, the set of instructions comprising one or more instructions that, when executed by one or more processors of a device, cause the device to perform the method of one or more of Aspects 17-26.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, since those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A PARENT NODE, COMPRISING:
at least one processor; and
at least one memory communicatively coupled with the at least one processor and storing processor-readable code that, when executed by the at least one processor, is configured to cause the parent node to:
receive, from an integrated access and backhaul (IAB) node that includes a distributed unit (IAB-DU) and a mobile termination function (IAB-MT), signaling that indicates one or more beam-specific parameters related to a multiplexing capability for a beam pair that includes an IAB-MT beam and an IAB-DU beam associated with the IAB-MT beam, wherein the one or more beam-specific parameters indicate that the beam pair supports one or more simultaneous multiplexing modes, the one or more simultaneous multiplexing modes including one or more of: a simultaneous half-duplexing mode, or a simultaneous full-duplexing mode, wherein the signaling received from the IAB node includes a request to switch the beam pair from a first simultaneous multiplexing mode of the one or more simultaneous multiplexing modes to a second simultaneous multiplexing mode of the one or more simultaneous multiplexing modes; and
transmit, to the IAB node, one or more scheduling parameters for the IAB-MT based at least in part on the signaling that indicates the one or more beam-specific parameters.

2. The parent node of claim 1, wherein the one or more beam-specific parameters include a time scale associated with the switch.

3. The parent node of claim 1, wherein the one or more beam-specific parameters include one or more constraints on resource utilization over the IAB-MT beam included in the beam pair.

4. The parent node of claim 1, wherein the one or more beam-specific parameters include a time-frequency resource pattern to associate with the IAB-MT beam included in the beam pair.

5. The parent node of claim 1, wherein the one or more beam-specific parameters indicate one or more IAB-DU beams or IAB-DU child links that are requested to be associated with or restricted from being associated with the IAB-MT beam included in the beam pair.

6. The parent node of claim 1, wherein the signaling that indicates the one or more beam-specific parameters includes F1 application protocol (F1-AP) signaling, a medium access control (MAC) control element (MAC-CE), or uplink control information (UCI) that indicates the one or more beam-specific parameters.

7. The parent node of claim 1, wherein the one or more scheduling parameters configure, at one or more of the parent node or the IAB node, each respective time resource of a plurality of time resources as one of a hard resource, a soft resource, or a not available resource.

8. The parent node of claim 1, wherein the one or more scheduling parameters configure, at one or more of the parent node or the IAB node, each respective time resource of a plurality of time resources as one of a downlink-only resource, an uplink-only resource, or a flexible resource.

9. The parent node of claim 1, wherein the one or more simultaneous multiplexing modes include the simultaneous half-duplexing mode, and wherein the simultaneous half-duplexing mode comprises the IAB-MT receiving a signal from the parent node using an IAB-MT beam and the IAB-DU simultaneously receiving a signal from a child node using an IAB-DU beam.

10. An integrated access and backhaul (IAB) node that includes a distributed unit (IAB-DU) and a mobile termination function (IAB-MT), comprising:
at least one processor; and
at least one memory communicatively coupled with the at least one processor and storing processor-readable code that, when executed by the at least one processor, is configured to cause the IAB node to:
transmit, to a parent node, signaling that indicates one or more beam-specific parameters related to a multiplexing capability for a beam pair that includes an IAB-MT beam and an IAB-DU beam associated with the IAB-MT beam, wherein the one or more beam-specific parameters indicate that the beam pair supports one or more simultaneous multiplexing modes, the one or more simultaneous multiplexing modes including one or more of: a simultaneous half-duplexing mode, or a simultaneous full-duplexing mode, wherein the signaling received from the IAB node includes a request to switch the beam pair from a first simultaneous multiplexing mode of the one or more simultaneous multiplexing modes to a second simultaneous multiplexing mode of the one or more simultaneous multiplexing modes; and
receive, from the parent node, one or more scheduling parameters for the IAB-MT based at least in part on the signaling that indicates the one or more beam-specific parameters.

11. The IAB node of claim 10, wherein the one or more beam-specific parameters include a time scale associated with the switch.

12. The IAB node of claim 10, wherein the one or more beam-specific parameters include one or more constraints on resource utilization over the IAB-MT beam included in the beam pair.

13. The IAB node of claim 10, wherein the one or more beam-specific parameters include a time-frequency resource pattern to associate with the IAB-MT beam included in the beam pair.

14. The IAB node of claim 10, wherein the one or more beam-specific parameters indicate one or more IAB-DU beams or IAB-DU child links that are requested to be associated with or restricted from being associated with the IAB-MT beam included in the beam pair.

15. The IAB node of claim 10, wherein the signaling that indicates the one or more beam-specific parameters includes f1 application protocol (f1-AP) signaling, a medium access control (MAC) control element (MAC-CE), or uplink control information (UCI) that indicates the one or more beam-specific parameters.

16. The IAB node of claim 10, wherein the one or more scheduling parameters configure each respective time resource of a plurality of time resources at the IAB NODE as one of a hard resource, a soft resource, or a not available resource.

17. The IAB node of claim 10, wherein the one or more scheduling parameters configure each respective time resource of a plurality of time resources at the IAB node as one of a downlink-only resource, an uplink-only resource, or a flexible resource.

18. A non-transitory computer-readable medium storing a set of instructions for wireless communication, the set of instructions comprising:
one or more instructions that, when executed by one or more processors of a parent node, cause the parent node to:
receive, from an integrated access and backhaul (IAB) node that includes a distributed unit (IAB-DU) and a mobile termination function (IAB-MT), signaling that indicates one or more beam-specific parameters related to a multiplexing capability for a beam pair that includes an IAB-MT beam and an IAB-DU beam associated with the IAB-MT beam, wherein the one or more beam-specific parameters indicate that the beam pair supports one or more simultaneous multiplexing modes, the one or more simultaneous multiplexing modes including one or more of: a simultaneous half-duplexing mode, or a simultaneous full-duplexing mode, wherein the signaling received from the IAB node includes a request to switch the beam pair from a first simultaneous multiplexing mode of the one or more simultaneous multiplexing modes to a second simultaneous multiplexing mode of the one or more simultaneous multiplexing modes; and
transmit, to the IAB node, one or more scheduling parameters for the IAB-MT based at least in part on the signaling that indicates the one or more beam-specific parameters.

19. The non-transitory computer-readable medium of claim 8, wherein the one or more beam-specific parameters indicate one or more IAB-DU beams or IAB-DU child links that are requested to be associated with or restricted from being associated with the IAB-MT beam included in the beam pair.

20. A non-transitory computer-readable medium storing a set of instructions for wireless communication, the set of instructions comprising:
one or more instructions that, when executed by one or more processors of an integrated access and backhaul (IAB) node, cause the IAB node to:
transmit, to a parent node, signaling that indicates one or more beam-specific parameters related to a multiplexing capability for a beam pair that includes a mobile termination function (IAB-MT) beam and a distributed unit (DU) beam associated with the IAB-MT beam, wherein the one or more beam-specific parameters indicate that the beam pair supports one or more simultaneous multiplexing modes, the one or more simultaneous multiplexing modes including one or more of: a simultaneous half-duplexing mode, or a simultaneous full-duplexing mode, wherein the signaling received from the IAB node includes a request to switch the beam pair from a first simultaneous multiplexing mode of the one or more simultaneous multiplexing modes to a second simultaneous multiplexing mode of the one or more simultaneous multiplexing modes; and
receive, from the parent node, one or more scheduling parameters for an IAB-MT based at least in part on the signaling that indicates the one or more beam-specific parameters.

21. The non-transitory computer-readable medium of claim 20, wherein the one or more beam-specific parameters indicate one or more DU beams or du child links that are requested to be associated with or restricted from being associated with the IAB-MT beam included in the beam pair.

22. The non-transitory computer-readable medium of claim 20, wherein the one or more beam-specific parameters include a time-frequency resource pattern to associate with the IAB-MT beam included in the beam pair.

23. The non-transitory computer-readable medium of claim 18, wherein the one or more beam-specific parameters include one or more constraints on resource utilization over the IAB-MT beam included in the beam pair.

24. The non-transitory computer-readable medium of claim 18, wherein the signaling that indicates the one or more beam-specific parameters includes f1 application protocol (f1-AP) signaling, a medium access control (MAC) control element (MAC-CE), or uplink control information (UCI) that indicates the one or more beam-specific parameters.

25. The non-transitory computer-readable medium of claim 18, wherein the one or more scheduling parameters configure each respective time resource of a plurality of time resources at the IAB node as one of a hard resource, a soft resource, or a not available resource.

26. The non-transitory computer-readable medium of claim 20, wherein the one or more scheduling parameters configure each respective time resource of a plurality of time resources at the IAB node as one of a hard resource, a soft resource, or a not available resource.

* * * * *